(12) United States Patent
Hendry et al.

(10) Patent No.: US 10,904,531 B2
(45) Date of Patent: Jan. 26, 2021

(54) ADAPTIVE PARAMETERS FOR CODING OF 360-DEGREE VIDEO

(71) Applicant: QUALCOMM Incorporated, San Diego, CA (US)

(72) Inventors: Hendry, San Diego, CA (US); Muhammed Coban, Carlsbad, CA (US); Geert Van Der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 15/922,723

(22) Filed: Mar. 15, 2018

(65) Prior Publication Data

US 2018/0278936 A1 Sep. 27, 2018

Related U.S. Application Data

(60) Provisional application No. 62/475,838, filed on Mar. 23, 2017.

(51) Int. Cl.
*H04N 19/126* (2014.01)
*H04N 19/597* (2014.01)
(Continued)

(52) U.S. Cl.
CPC ......... *H04N 19/126* (2014.11); *H04N 19/103* (2014.11); *H04N 19/124* (2014.11);
(Continued)

(58) Field of Classification Search
CPC .. H04N 19/103; H04N 19/124; H04N 19/126; H04N 19/167; H04N 19/176; H04N 19/182; H04N 19/19; H04N 19/597
See application file for complete search history.

(56) References Cited

U.S. PATENT DOCUMENTS

| 7,859,574 B1 | 12/2010 | Alvarez et al. |
| 2014/0211842 A1* | 7/2014 | Zhao ................... H04N 19/147 375/240.02 |

(Continued)

FOREIGN PATENT DOCUMENTS

| CN | 106412594 A | 2/2017 |
| CN | 107094251 A | 8/2017 |

(Continued)

OTHER PUBLICATIONS

Bauermann I., et al., "H.264 Based Coding of Omnidirectional Video", In: "Computer Vision and Graphics: International Conference, ICCVG 2004, Warsaw, Poland, Sep. 2004; Proceedings/ ed. by K. Wojciechowski.. [et al.]", Jan. 1, 2006, Kluwer Academic Publishers, Dordrecht, NL, XP055320200, ISBN: 978-1-4020-4178-5, vol. 32, DOI: 10.1007/1-4020-4179-9_30, pp. 209-215.

(Continued)

*Primary Examiner* — Francis Geroleo
(74) *Attorney, Agent, or Firm* — Polsinelli/Qualcomm

(57) ABSTRACT

Techniques and systems are provided for processing 360-degree video data. For example, a picture of the 360-degree video data can be obtained. The picture can include samples projected from a three-dimensional format to a two-dimensional format. A weight value can be determined for at least one sample of the picture. The weight value can be determined based at least on a position of the at least one sample in the picture. At least one adaptive parameter can be determined for the at least one sample using the determined weight value. The at least one adaptive parameter can include one or more of an adaptive weighted distortion, an adaptive weighted quantization parameter value, or an adaptive weighted lambda value. A cost associated with coding the at least one sample using one or more coding modes can (Continued)

be determined using the at least one adaptive parameter of the at least one sample.

26 Claims, 11 Drawing Sheets

(51) Int. Cl.
*H04N 19/19* (2014.01)
*H04N 19/167* (2014.01)
*H04N 19/124* (2014.01)
*H04N 19/103* (2014.01)
*H04N 19/176* (2014.01)
*H04N 19/182* (2014.01)
*H04N 19/147* (2014.01)

(52) U.S. Cl.
CPC ......... *H04N 19/147* (2014.11); *H04N 19/167* (2014.11); *H04N 19/176* (2014.11); *H04N 19/182* (2014.11); *H04N 19/19* (2014.11); *H04N 19/597* (2014.11)

(56) References Cited

U.S. PATENT DOCUMENTS

| | | | |
|---|---|---|---|
| 2018/0063530 A1* | 3/2018 | Kondo | H04N 19/124 |
| 2018/0084257 A1* | 3/2018 | Abbas | H04N 19/176 |

FOREIGN PATENT DOCUMENTS

| | | | |
|---|---|---|---|
| EP | 1677252 | A1 | 7/2006 |
| EP | 2475163 | A1 | 7/2012 |
| EP | 3301921 | A1 | 4/2018 |
| WO | 2014193630 | A1 | 12/2014 |
| WO | 2018017599 | A1 | 1/2018 |

OTHER PUBLICATIONS

Bjontegaard G., et al., "H.26L TML 8 Reflecting Decisions of Porto Seguro", H.26L Test Model Long Term Number 8 (TML-8) drafto, 14th VCEG Meeting; Sep. 24, 2001-Sep. 27, 2001; Santa Barbara, California, US; (Video Coding Experts Group of ITU-T SG.16),, No. VCEG-N10, Sep. 20, 2001, XP030O03263, pp. 1-46.

Hendry et al., "AHG8: Adaptive QP for ERP 360° Video ERP Projection", 6th JVET Meeting; Mar. 31, 2017-Jul. 4, 2017; Hobart; (The Joint Video Exploration Team of ISO/IEC JTC1/SC29/WG11 and ITU-T SG.16); URL: http://phenix.int-evry.fr/jvet/,, No. JVET-F0049, Mar. 25, 2017, XP030150707, 4 pages.

International Search Report and Written Opinion—PCT/US2018/022775—ISA/EPO—dated Jun. 15, 2018.

Li Y., et al., "Spherical Domain Rate-Distortion Optimization for 360-Degree Video Coding", 2017 IEEE Proceedings of the IEEE International Conference on Multimedia and Expo (ICME), IEEE, Jul. 10, 2017, XP033146709, DOI: 10.1109/ICME.2017.8019492 [retrieved on Aug. 28, 2017], pp. 709-714.

Racape F., et al., "AHG8: Adaptive QP for 360 Video Coding", 6th JVET Meeting; Mar. 31, 2017-Apr. 7, 2017; Hobart; (The Joint Video Exploration Team of ISO/IEC JTC1/SC291WG11 and ITU-T SG.16); URL: http://phenix.int-evry.fr/jvet/,, No. JVET-F0038, Mar. 23, 2017, XP030150691, 3 pages.

Sun Y., et al., "AHG8: WS-PSNR for 360 Video Objective Quality Evaluation", 4th JVET Meeting; Oct. 15, 2016-Oct. 21, 2016; Chengdu; (The Joint Video Exploration Team of IS0/IEC JTC1/SC29/WG11 and ITU-T SG.16); URL: http://phenix.int-evry.fr/jvet/,, No. JVET-D0040, Oct. 6, 2016, XP030150268, 5 pages.

Tang M., et al., "Optimized Video Coding for Omnidirectional Videos", Proceedings of the IEEE International Conference on Multimedia and Expo (ICME), IEEE, Jul. 10, 2017, XP033146632, DOI:10.1109/ICME.2017.8019460 [retrieved on Aug. 28, 2017], pp. 799-804.

Yule S., et al., "AHG8: Stretching Ratio based Adaptive Quantization for 360 Video", 6th JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int-evry.fr/jvet/,, No. JVET-F0072, Mar. 30, 2017, XP030150744, 4 pages.

* cited by examiner

900

```
┌─────────────────────────────────────┐
│ OBTAIN A PICTURE OF THE 360-DEGREE VIDEO │
│ DATA, WHEREIN THE PICTURE INCLUDES  │
│ SAMPLES PROJECTED FROM A THREE-     │
│ DIMENSIONAL FORMAT TO A TWO-DIMENSIONAL │
│ FORMAT                              │
│ 902                                 │
└─────────────────────────────────────┘
                  │
                  ▼
┌─────────────────────────────────────┐
│ DETERMINE A WEIGHT VALUE FOR AT LEAST ONE │
│ SAMPLE OF THE PICTURE, WHEREIN THE WEIGHT │
│ VALUE IS DETERMINED BASED AT LEAST ON A │
│ POSITION OF THE AT LEAST ONE SAMPLE IN THE │
│ PICTURE                             │
│ 904                                 │
└─────────────────────────────────────┘
                  │
                  ▼
┌─────────────────────────────────────┐
│ DETERMINE AT LEAST ONE ADAPTIVE     │
│ PARAMETER FOR THE AT LEAST ONE SAMPLE │
│ USING THE DETERMINED WEIGHT VALUE, THE AT │
│ LEAST ONE ADAPTIVE PARAMETER INCLUDING │
│ ONE OR MORE OF AN ADAPTIVE WEIGHTED │
│ DISTORTION, AN ADAPTIVE WEIGHTED    │
│ QUANTIZATION PARAMETER (QP) VALUE, OR AN │
│ ADAPTIVE WEIGHTED LAMBDA VALUE      │
│ 906                                 │
└─────────────────────────────────────┘
                  │
                  ▼
┌─────────────────────────────────────┐
│ DETERMINE A COST ASSOCIATED WITH CODING │
│ THE AT LEAST ONE SAMPLE USING ONE OR MORE │
│ CODING MODES, WHEREIN THE COST IS   │
│ DETERMINED USING THE AT LEAST ONE   │
│ ADAPTIVE PARAMETER DETERMINED FOR THE AT │
│ LEAST ONE SAMPLE                    │
│ 908                                 │
└─────────────────────────────────────┘
```

FIG. 9

ADAPTIVE PARAMETERS FOR CODING OF 360-DEGREE VIDEO

CROSS-REFERENCE TO RELATED APPLICATIONS

This application claims the benefit of U.S. Provisional Application No. 62/475,838, filed Mar. 23, 2017, which is hereby incorporated by reference, in its entirety and for all purposes.

FIELD

This application is related to processing 360-degree video. More specifically, this application relates to systems and methods for determining one or more adaptive parameters for coding 360-degree video.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. One type of video is 360-degree video. 360-degree video can provide viewers an immersed experience. For example, 360-degree video can provide a viewer with a virtual reality experience, putting the viewer in a virtually different time and/or place. As another example, 360-degree video can provide a viewer with a first-person view of video content captured by a remote device (e.g., an unmanned aerial vehicle, a mobile device, a camera device, and/or other device).

BRIEF SUMMARY

In some examples, techniques and systems are described herein for determining one or more adaptive parameters for coding 360-degree video. The adaptive parameters can also be referred to herein as adaptive encoding parameters. Projection schemes for 360-degree video have non-uniform distortion across pictures. In one illustrative example, a picture of 360-degree video with equirectangular projection (ERP) leads to a two-dimensional picture having pole areas with higher distortion than equatorial (middle) areas of the picture. A picture can also be referred to herein as a frame (e.g., a video frame) or an image. In such cases, an encoder may spend more bits in the pole areas due to the rate-distortion optimization analysis that is used to select a suitable coding mode. The higher number of bits used for the pole areas causes the quality of viewports in the poles areas to be higher than the quality of viewports in the equator area. A viewport refers to a view from a particular area within a 360-degree scene, which can be rendered for display.

The one or more adaptive parameters take into account the non-uniform distortion introduced when three-dimensional (e.g., spherical) video data of a 360-degree video is projected to a two-dimensional format. For example, the non-uniform distortion property of projection schemes for 360-degree videos can be exploited to improve compression efficiency of 360-degree videos by determining and applying the one or more adaptive parameters to different regions within pictures of the 360-degree videos in proportion to distortion in the different regions. In some cases, the one or more adaptive parameters can be used to select a coding mode for coding one or more samples (e.g., a pixel, a block of pixels, a row of blocks, etc.) of a picture. For instance, the coding mode can be selected based on a cost (e.g., a rate-distortion cost or other suitable metric), which can be determined based on the one or more adaptive parameters.

In some examples, a weight can be determined for the one or more samples (e.g., for a pixel, for a block of pixels, for a row of blocks, etc.), and can be used to determine the one or more adaptive parameters for the one or more samples. In some cases, a normalized weight can be determined for the one or more samples, and can be used to determine the one or more adaptive parameters. In some examples, the one or more adaptive parameters can include an adaptive weighted distortion, an adaptive weighted quantization parameter (QP) value, and/or an adaptive weighted lambda value. The one or more adaptive parameters for the one or more samples (e.g., the adaptive weighted distortion, adaptive weighted QP value, and/or an adaptive weighted lambda value) can then be used to determine the cost associated with coding the one or more samples using one or more coding modes.

According to at least one example, a method of processing 360-degree video data is provided. The method comprises obtaining a picture of the 360-degree video data. The picture comprises samples projected from a three-dimensional format to a two-dimensional format. The method further comprises determining a weight value for at least one sample of the picture. The weight value is determined based at least on a position of the at least one sample in the picture. The method further comprises determining at least one adaptive parameter for the at least one sample using the determined weight value. The at least one adaptive parameter comprises one or more of an adaptive weighted distortion, an adaptive weighted quantization parameter (QP) value, or an adaptive weighted lambda value. The method further comprises determining a cost associated with coding the at least one sample using one or more coding modes. The cost is determined using the at least one adaptive parameter determined for the at least one sample.

In another example, an apparatus for processing 360-degree video data is provided that includes a memory configured to store the 360-degree video data and a processor. The processor is configured to and can obtain a picture of the 360-degree video data. The picture comprises samples projected from a three-dimensional format to a two-dimensional format. The processor is further configured to and can determine a weight value for at least one sample of the picture. The weight value is determined based at least on a position of the at least one sample in the picture. The processor is further configured to and can determine at least one adaptive parameter for the at least one sample using the determined weight value. The at least one adaptive parameter comprises one or more of an adaptive weighted distortion, an adaptive weighted quantization parameter (QP) value, or an adaptive weighted lambda value. The processor is further configured to and can determine a cost associated with coding the at least one sample using one or more coding modes. The cost is determined using the at least one adaptive parameter determined for the at least one sample.

In another example, a non-transitory computer-readable medium is provided having stored thereon instructions that, when executed by one or more processors, cause the one or more processor to: obtain a picture of the 360-degree video data, wherein the picture comprises samples projected from a three-dimensional format to a two-dimensional format; determine a weight value for at least one sample of the picture, wherein the weight value is determined based at least on a position of the at least one sample in the picture;

determine at least one adaptive parameter for the at least one sample using the determined weight value, the at least one adaptive parameter comprising one or more of an adaptive weighted distortion, an adaptive weighted quantization parameter (QP) value, or an adaptive weighted lambda value; and determine a cost associated with coding the at least one sample using one or more coding modes, wherein the cost is determined using the at least one adaptive parameter determined for the at least one sample.

In another example, an apparatus for processing 360-degree video data is provided. The apparatus includes means for obtaining a picture of the 360-degree video data. The picture comprises samples projected from a three-dimensional format to a two-dimensional format. The apparatus further includes means for determining a weight value for at least one sample of the picture. The weight value is determined based at least on a position of the at least one sample in the picture. The apparatus further includes means for determining at least one adaptive parameter for the at least one sample using the determined weight value. The at least one adaptive parameter comprises one or more of an adaptive weighted distortion, an adaptive weighted quantization parameter (QP) value, or an adaptive weighted lambda value. The apparatus further includes means for determining a cost associated with coding the at least one sample using one or more coding modes. The cost is determined using the at least one adaptive parameter determined for the at least one sample.

In some aspects, the method, apparatuses, and computer-readable medium described above may further comprise determining a coding mode for encoding the at least one sample, the coding mode being determined based on the determined cost; and encoding the at least one sample using the determined coding mode.

In some aspects, the at least one adaptive parameter comprises the adaptive weighted distortion. The adaptive weighted distortion comprises a distortion of the at least one sample multiplied by the determined weight value. In some cases, the distortion of the at least one sample comprises a difference between an original value of the at least one sample and a reconstructed value of the at least one sample.

In some aspects, the at least one adaptive parameter comprises the adaptive weighted QP value. The adaptive weighted QP value comprises a QP value of the at least one sample modified by the determined weight value.

In some aspects, the at least one adaptive parameter comprises the adaptive weighted lambda value. The adaptive weighted lambda value comprises a lambda value of the at least one sample modified by the determined weight value. The lambda value of the at least one sample can include a Lagrange constant representing a trade-off between distortion and a number of bits.

In some aspects, the at least one adaptive parameter comprises the adaptive weighted distortion and the adaptive weighted QP value. The adaptive weighted distortion comprises a distortion of the at least one sample multiplied by the determined weight value, and the adaptive weighted QP value comprises a QP value of the at least one sample modified by the determined weight value.

In some aspects, the at least one adaptive parameter comprises the adaptive weighted distortion and the adaptive weighted lambda value. The adaptive weighted distortion comprises a distortion of the at least one sample multiplied by the determined weight value, and the adaptive weighted lambda value comprises a lambda value of the at least one sample modified by the determined weight value.

In some aspects, the method, apparatuses, and computer-readable medium described above may further comprise determining a normalized weight value for the at least one sample of the picture. In such aspects, the normalized weight value is determined based on a sum of weights of the samples in the picture and based on a height of the picture. In some cases, the at least one adaptive parameter is determined for the at least one sample using the determined normalized weight value.

In some aspects, the weight value is further determined based on a resolution of the two-dimensional format. In some examples, the at least one sample comprises a pixel, a block of pixels, or a row of blocks of pixels. In some aspects, the two-dimensional format comprises an equirectangular geometry (also referred to as an equirectangular format) or other suitable format to which 360-degree video data can be projected. In some aspects, the cost comprises a rate-distortion optimization cost.

In some cases, the apparatus comprises a camera for capturing 360-degree video pictures. In some cases, the apparatus comprises a mobile device with a camera for capturing 360-degree video pictures. In some cases, the apparatus comprises a display for displaying 360-degree video.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 9 is a flowchart illustrating an example of a process for processing 360-degree video data, in accordance with some examples;

DETAILED DESCRIPTION

Figure 1:
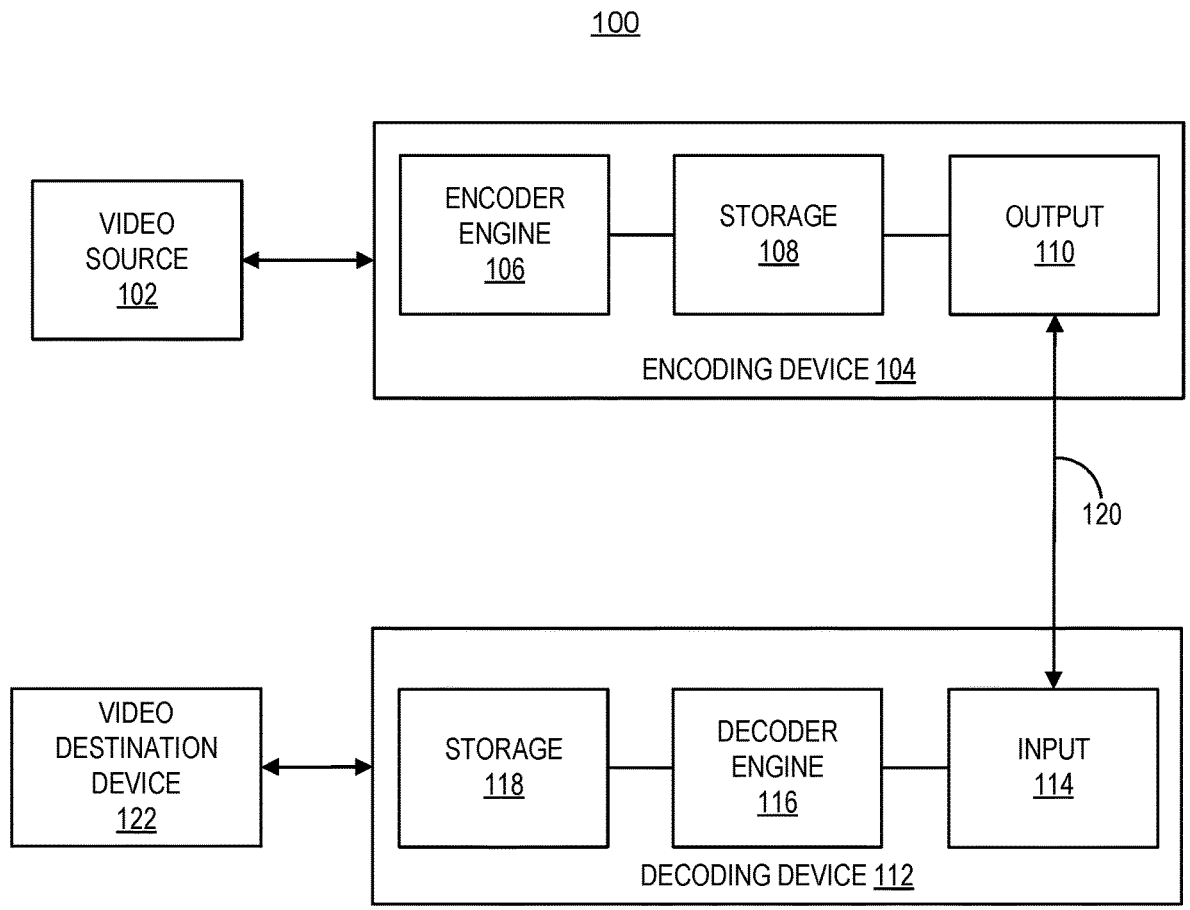
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the subject matter set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored, in which case the data is not stored via carrier waves and/or transitory electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Video content can be captured and coded as 360-degree video content. As described in more detail below, one or more systems and methods described herein are directed to determining one or more adaptive parameters for coding 360-degree video. The one or more adaptive parameters take into account the non-uniform distortion introduced when three-dimensional (e.g., spherical) video data of a 360-degree video is projected to a two-dimensional format. For example, the non-uniform distortion property of projection schemes for 360-degree videos can be exploited to improve compression efficiency of 360-degree videos by determining and applying the one or more adaptive parameters to different regions within pictures of the 360-degree videos in proportion to distortion in the different regions. In some cases, the one or more adaptive parameters can be used to select a coding mode for coding one or more samples of a picture. A weight or normalized weight can be determined for the one or more samples, and can be used to determine the one or more adaptive parameters for the one or more samples. The one or more adaptive parameters for the one or more samples can then be used to determine the cost associated with coding the one or more samples using one or more coding modes.

360-degree video is video captured of a 360-degree scene or environment, and can be rendered for immersive display of the 360-degree scene or environment. For instance, 360-degree video can represent a three-dimensional scene or environment that can be interacted with in a seemingly real or physical way. In some cases, 360-degree video can be captured and rendered at very high quality (e.g., high definition, 4K ultra-high definition, 8K ultra-high definition, and/or other high quality video), potentially providing a truly immersive 360-degree video or virtual reality experience. Illustrative examples of 360-degree video can include virtual reality video, augmented reality data, or any other type of 360-degree type of video content, whether captured, computer-generated, or the like. Illustrative examples of 360-degree video applications include live sporting events, augmented reality, gaming, training, education, sports video, online shopping, among others. In some cases, a user experiencing a 360-degree video environment uses electronic equipment, such as a head-mounted display (HMD), a mobile device, or other suitable device. In some cases, certain tools or clothing (e.g., gloves fitted with sensors) can be optionally used to interact with the virtual environment. As the user changes head orientation and/or moves in the real world, images rendered in the 360-degree video environment also change, giving the user the perception that the user is moving within the 360-degree video environment. In some cases, a 360-degree video environment can include sound that correlates with the movements of the user, giving the user the impression that the sounds originate from a particular direction or source.

In some applications, video from the real world can be used in the presentation of a 360-degree video or virtual reality environment, as opposed to computer-generated graphics that may be found, for example, in gaming and virtual worlds. In such real-world applications, a user can experience another location in the same way that the user can experience the user's present location. In one illustrative example, a user can experience a walking tour of Berlin while using a 360-degree video system that is situated in San Francisco. In some applications, 360-degree video can provide the ability to be virtually present in a non-physical world created by the rendering of natural and/or synthetic images (and in some cases sound) correlated by the movements of the immersed user, allowing the user to interact with that world.

A 360-degree video system can include a video capture device and a video display device, and possibly also other intermediate devices such as servers, data storage, and data transmission equipment. A video capture device may include a camera set, which can include a set of multiple cameras, each oriented in a different direction and capturing a different view. In one illustrative example, six cameras can be used to capture a full 360-degree view centered on the camera set's location. Some video capture devices may use fewer cameras. For example, some video capture devices can capture primarily side-to-side views or use lenses with a wide field of view. In one illustrative example, one or more cameras equipped with two fisheye lenses, positioned back-to-back, can be used to capture two images that together provide a 360-degree field of view. A video generally includes pictures (also referred to as frames or images), where a picture can include an electronically coded still image of a scene. Cameras capture a certain number of frames per second, which is usually referred to as the camera's frame rate.

In some cases, to provide a seamless 360-degree view, image stitching can be performed on the video pictures captured by each of the cameras in the camera set. Image stitching in the case of 360-degree video generation involves combining or merging video pictures from adjacent cameras (or lenses) in the area where the video pictures overlap or would otherwise connect. The result would be an approximately spherical picture, and the merged data can be represented in a planar fashion. For example, the spherical picture can be mapped to a two-dimensional representation and/or to planes of a geometry. For example, the spherical video data can be projected to an equirectangular geometry using equirectangular projection (ERP). As another example, the spherical video data can be projected to a geometry, such as a truncated square pyramid (TSP), a cube, a cylinder, a dodecahedron, and/or other suitable geometry. For example, the pixels in a merged video picture may be projected or mapped onto the planes of a TSP shape, a cube shape, or some other three-dimensional, planar shape (e.g., a pyramid, an octahedron, a decahedron, etc.). Video capture and video display devices can operate on a raster principle—meaning that a video picture is treated as a grid of pixels—in which case square planes, rectangular planes, or other suitably-shaped planes can be used to represent a spherical environment.

360-degree video pictures, mapped to a geometrical planar representation, can be encoded and/or compressed for storage and/or transmission. Encoding and/or compression can be accomplished using a video codec (e.g., code that is compliant with the High-Efficiency Video Coding (HEVC) standard, which is also known as H.265, the Advanced Video Coding standard, which is known as H.264, or other suitable codec) and results in a compressed video bitstream (or encoded video bitstream) or group of bitstreams. The video pictures of 360-degree video content can be encoded as a single-layer bitstream using temporal inter prediction (TIP), and the entire coded bitstream can be stored at a server. In some cases, the pictures of 360-degree video content can be encoded as a multi-layer bitstream using TIP and inter-layer prediction (ILP). Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, mobile devices that support 360-degree video applications, and/or other 180-degree or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device (e.g., of the receiver device) may render a video at the same frame rate at which the video was captured, or at a different frame rate. If needed, the bitstream including the 360-degree video can be transmitted to the receiver side, fully decoded by the decoder, and the region of the decoded picture corresponding to a portion of a scene being viewed (referred to as the field of view (FOV) of a viewer) by the wearer can be rendered by the rendering device for viewing by the wearer. The FOV of the viewer can be determined by the head-mounted display, or other 360-degree video display device, based on the movement of the wearer's head and/or eyes.

As noted above, 360-degree video pictures (e.g., mapped or projected to a 2D format or a geometric shape), can be encoded and/or compressed for storage and/or transmission, and a receiver device can decode and/or decompress the encoded 360-degree video pictures. FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and ITU-T H.265 (also known as High Efficiency Video Coding (HEVC)). Various extensions to HEVC that deal with multi-layer video coding exist, including the range and screen content coding extensions, 3D video coding extensions (3D-HEVC) and multiview extensions (MV-HEVC), and scalable extensions (SHVC). The HEVC and its extensions have been developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model).

Many embodiments described herein provide examples using the HEVC standard and/or extensions thereof. However, the techniques and systems described herein may also be applicable to other coding standards, such as AVC, MPEG, the JEM model, extensions thereof, and/or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. A picture or frame of a video is a still image of a scene. A picture or frame of the video data can include 360-degree video data mapped or projected onto planes of a geometry (e.g., a TSP, a cube, or other suitable geometry). The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction (or other suitable prediction) to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the picture to predict any prediction unit or prediction block of the slice. A P slice (uni-directional predicted pictures) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one picture. A B slice (bi-directional predictive pictures) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may include pixel data in the spatial domain (or pixel domain). The TUs may include coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bitrate efficiency, error resiliency, and providing systems layer interfaces. Each slice may reference a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every picture of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 10. An example of specific details of the decoding device 112 is described below with reference to FIG. 11.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

Figure 2B:
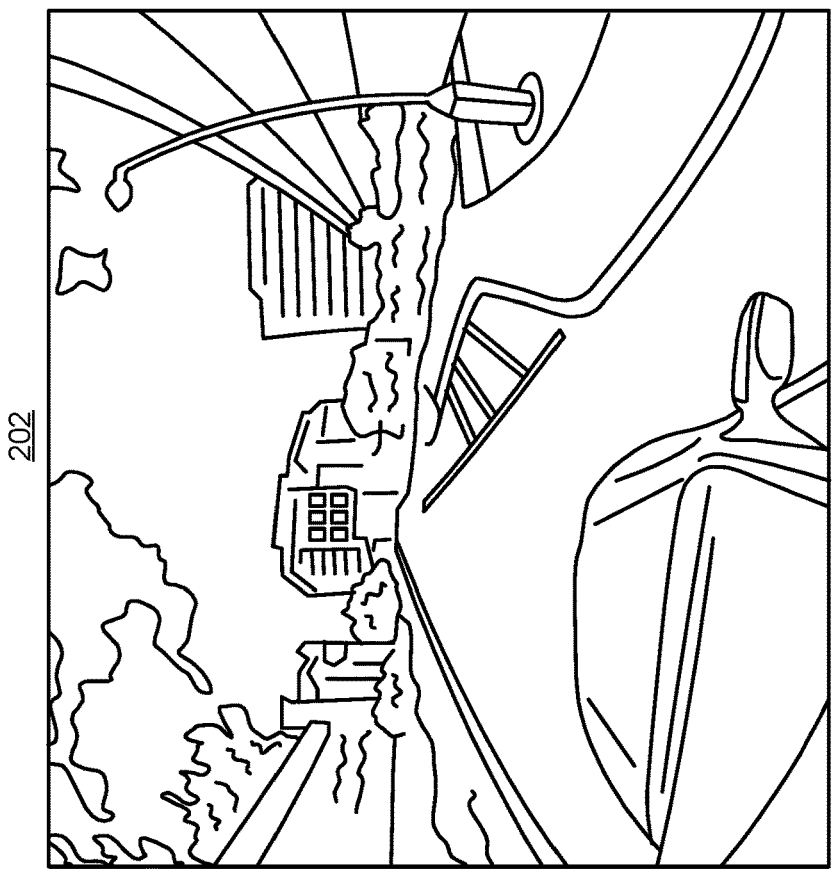
FIG. 2A and FIG. 2B are diagrams illustrating examples of video pictures captured by omnidirectional cameras that use fisheye lenses to capture a wide field of view, in accordance with some examples.
Figure 2A:
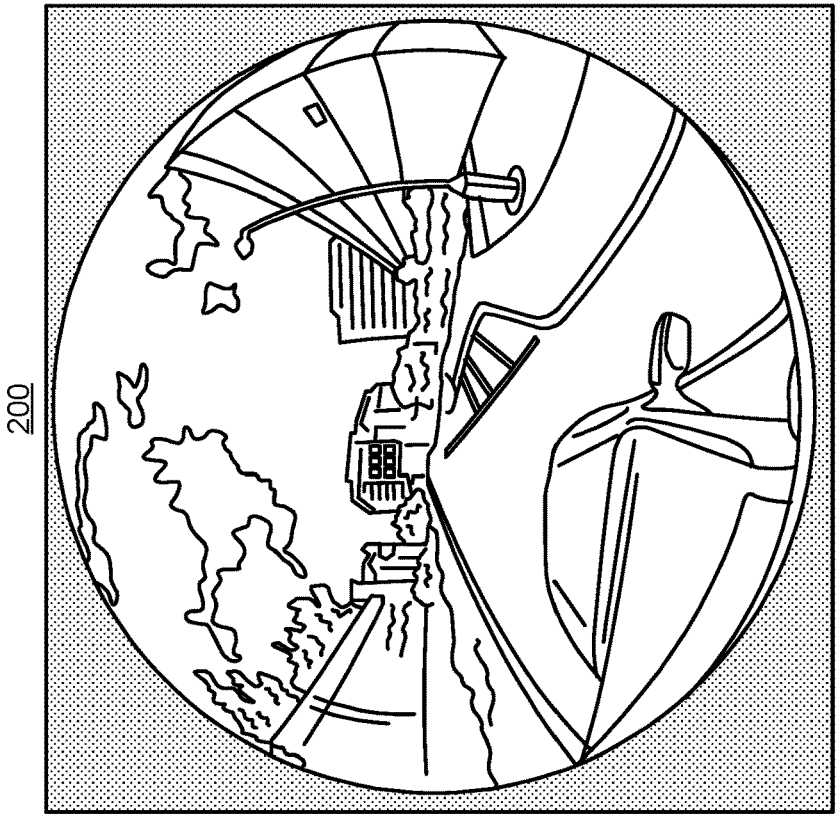

In some implementations, camera sets for capturing 360-degree video can include omnidirectional cameras, catadioptric cameras (a camera that uses lenses and curved mirrors), cameras equipped with fisheye lenses, and/or other suitable cameras. One example of an omnidirectional camera is the Ricoh Theta-S™, which uses two fisheye lenses that focus in opposite directions. FIG. 2A and FIG. 2B illustrate examples of video pictures captured by omnidirectional cameras that use fisheye lenses to capture a wide field of view. In the example of FIG. 2A, the video picture 200 includes a circular fisheye image. Fisheye lenses are capable of capturing very wide angles, such as 280 degrees or greater. Hence, a camera equipped with two fisheye lenses, positioned back-to-back, can capture two images that together provide 360 degrees of view (or more). Non-wide-angle fisheye lenses capture a field of view of on the order of about 45 to about 90 degrees. A field of view can alternatively or additionally be expressed in radians.

In order to capture a wide angle, fisheye lenses distort the image of a scene. As illustrated in FIG. 2A, the scene captured in the video picture 200 is circular in shape, and is warped from the center to the outside edges of this circular region. Because camera sensors are rectangular, the video picture 200 is rectangular and the image includes areas, here illustrated using stippling, that are not part of the scene. The pixels in these regions are considered not usable, since these pixels are not part of the scene.

The example of FIG. 2B includes a video picture 202 that includes a full-frame fisheye image. In this type of video picture 202, a wide-angle field of view has also been captured in a circular region, with the scene being warped into the circular region. In this example, the image has been scaled (e.g., made larger) so the scene fills the edges of the rectangular picture. This example video picture 202 does not include the unusable areas, and some parts of the scene that can be captured by the lens have been cropped out or not captured.

As described above, other types of cameras can also be used to capture 360-degree video. For example, a camera set can include a set of multiple cameras (e.g., 5, 6, 7, or other number of cameras needed to capture a sufficient number of views of a scene). Each camera can be oriented in a different direction and capturing a different view of a scene. Image stitching can then be performed on the video pictures captured by each of the cameras in the camera set to provide a seamless 360-degree view.

Figure 3:
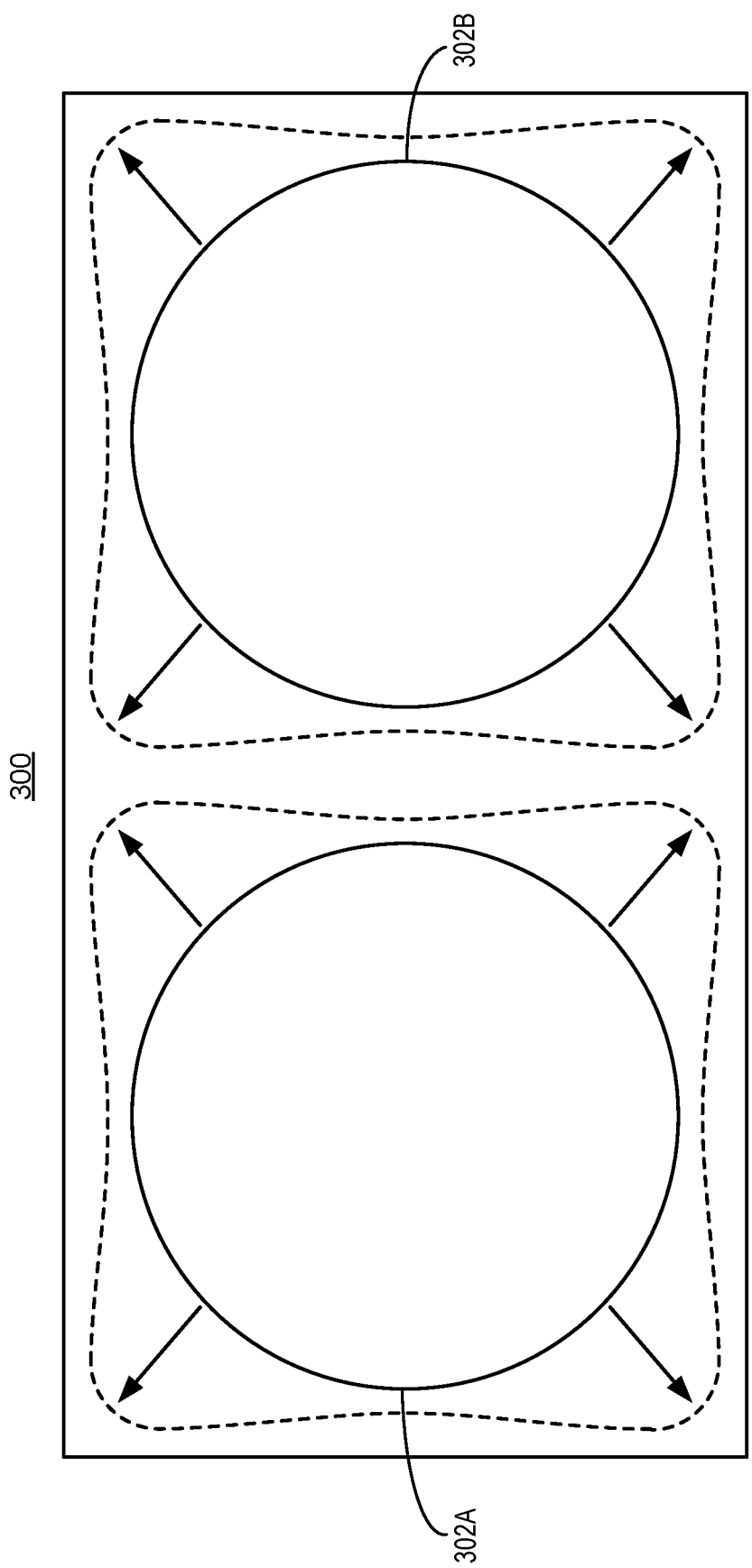
FIG. 3 is a diagram illustrating an example of an equirectangular video picture, in accordance with some examples.

360-degree video data is spherical in nature, and can be remapped to other geometries or formats. These other geometries can be used to store, encode, transmit, decode, render, and/or view the 360-degree video. One example geometry is an equirectangular geometry using equirectangular projection (ERP). FIG. 3 illustrates an example of an equirectangular video picture 300 based on two fisheye images 302A, 302B. In this example equirectangular video picture 300, the usable pixels from the two fisheye images 302A, 302B (e.g., pixels in the circular regions) have been mapped into an equirectangular geometry. In this example, each fisheye image 302A, 302B includes a 180-degree or greater field of view, so that, together, the two fisheye images 302A, 302B encompass a 360-degree field of view (possibly with some overlap).

Mapping pixels from the fisheye images 302A, 302B has the effect of unwarping the scene captured in the fisheye images 302A, 302B, and stretching the pixels towards the edges of the video picture 300. The resulting equirectangular image may appear stretched at the top and bottom of the video picture 300, causing the video picture 300 to have a non-uniform distortion. A well-known equirectangular projection is a Mercator projection, in which the geography of the Earth is presented with orthogonal latitude and longitude lines.

In various implementations, the fisheye images 302A, 302B can be mapped to other geometries, such as onto the faces formed by a cube, a cylinder, a pyramid, a truncated square pyramid (TSP), or some other geometric shape. In each of these cases, in the event fisheye lenses are used, distortion present in the fisheye images 302A, 302B can be corrected and unusable pixels can be eliminated.

Figure 4A:
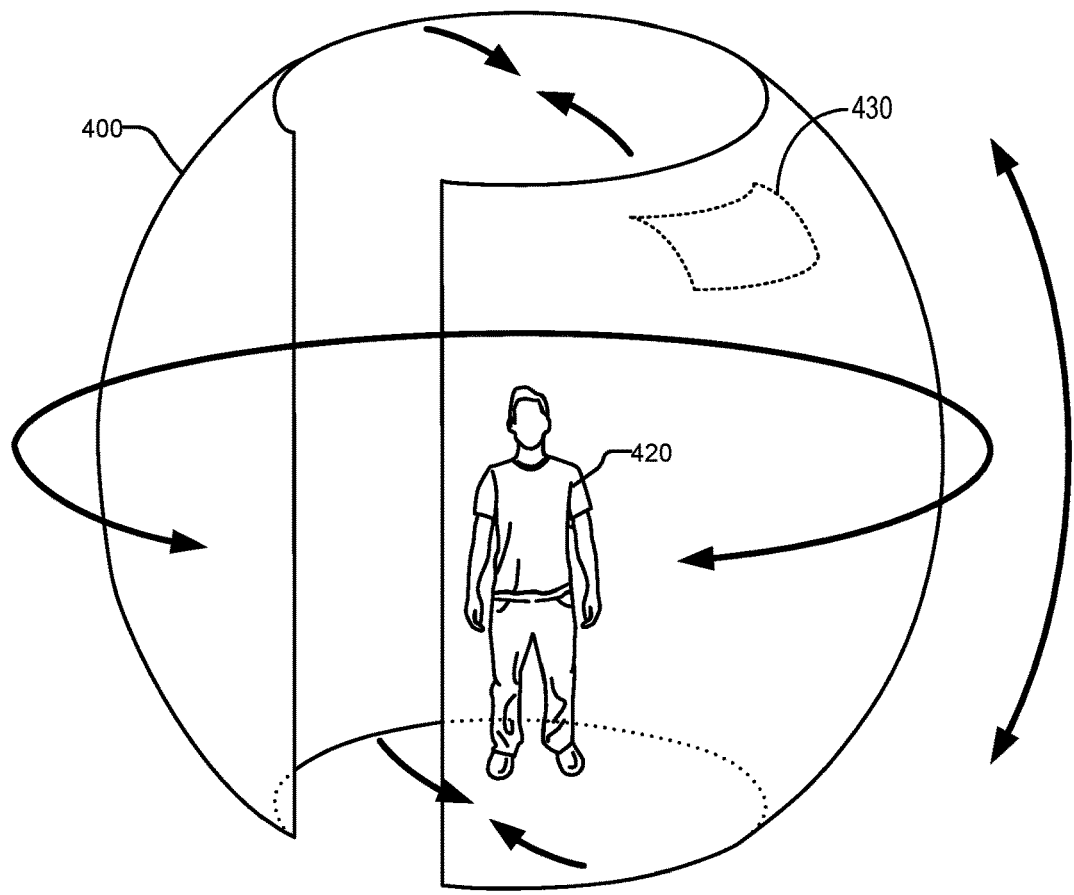
FIG. 4A and FIG. 4B are diagrams illustrating an example of a 360-degree video picture being used in a 360-degree video presentation, in accordance with some examples.
Figure 4B:
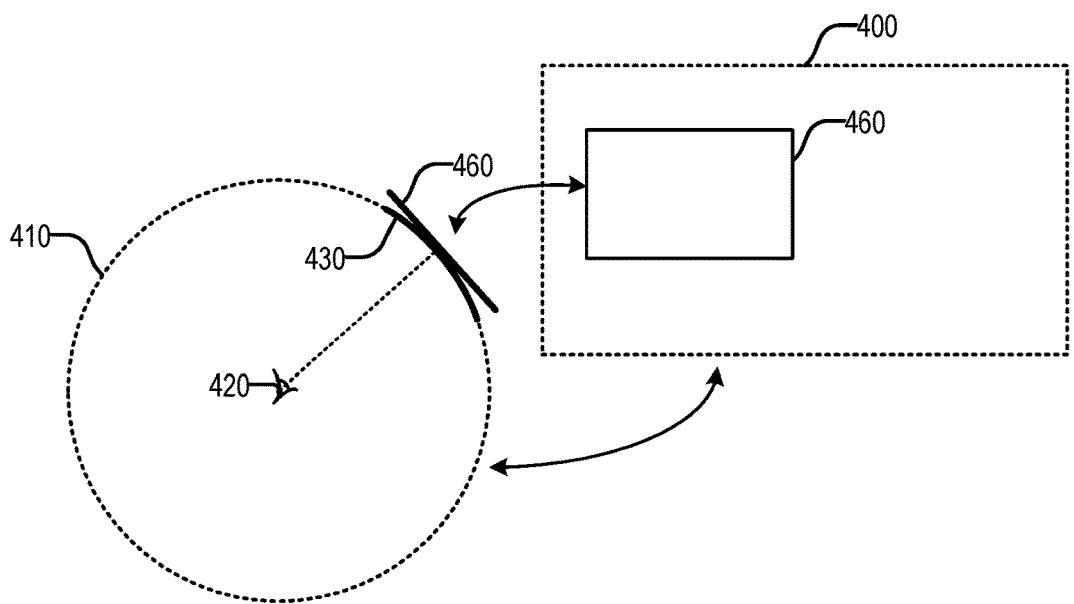

FIG. 4A and FIG. 4B illustrate an example of a 360-degree video picture 400 being used in a 360-degree video presentation. The 360-degree video picture 400 can be mapped onto a spherical space to form a spherical representation 410 (also referred to as a sphere) that represents a 360-degree scene or environment. A region 430 of the resulting spherical representation 410 (e.g., corresponding to a field of view (FOV) of a viewer 420) can be displayed to the viewer 420 using a 360-degree display device, such as a head mounted display (HMD) or a non-HMD display (e.g., a TV, a mobile device, a wearable device, or other suitable 360-degree video display device). For example, when a 360-degree video is played back on a 360-degree video display device, a viewport 460 can be rendered for display to the user. The viewport 460 can be a region (e.g., a rectangular region, or other suitable shape) on the plane of the 360-degree video picture 400 that is tangent to the sphere (e.g., the plane intersects with the sphere at a point in the region 430), where the plane of the viewport 460 is orthogonal to the user's viewing direction. In one illustrative example, a viewport can be generated by applying a projection technique to map the video data from the region 430 on the spherical representation 410 onto the plane of the 360-degree video picture 400 corresponding to the viewport 460. Examples of projection techniques include rectilinear projection (e.g., as discussed in JVET-D1030), stereographic projection, cylindrical projection, or other suitable projection techniques. In some examples, the region on the sphere that corresponds to a viewport can include the region enclosed by the four segments of four great circles (i.e., intersections of the sphere and planes that pass through the center point of the sphere).

In various examples, a captured 360-degree video picture can be mapped (using different projection techniques) to an equirectangular geometry, a TSP geometry, a cubical geometry, a cylindrical geometry, a pyramidal geometry, or any other suitable geometric shape for coding, transmission, and/or storage. In some cases, the geometric shape can be packed into a 2D video picture using a frame packing structure. The geometric shape can then be mapped to the spherical space and used by a 360-degree video display device to display the video. Once the 360-degree video picture 400 has been mapped to the spherical representation 410, the portion of spherical representation 410 that corresponds to the viewer's FOV (e.g., viewport 460) can be displayed by rendering the viewport 460. The viewer 420, using a 360-degree video display device, can view the portion of the spherical representation 410 from within the spherical representation. In many cases, the viewer 420 is positioned such that the "ground," from the viewer's perspective, is the bottom-most point of the spherical representation. In some cases, the equator of the spherical representation 410 is positioned at the viewer's eye level. In various implementations, the spherical representation 410 can be expanded or contracted to suit the height and/or position of the viewer 420 (e.g., if the viewer 420 is sitting, standing, or in some other position).

Problems exist with respect to compression efficiency of projected 360-degree video data. For example, as described above, 360-degree video is spherical in nature, and can be projected onto a two-dimensional format (an equirectangular shape or one or more planes of another geometry) before being transmitted from a transmitting device (e.g., an encoding device) and/or provided to a 360-degree video display device. However, projection schemes for 360-degree video lead to non-uniform distortion across pictures. In one illustrative example, a picture of 360-degree video with equirectangular projection (ERP) leads to a picture having pole areas with higher distortion than equatorial (middle) areas of the picture. In such cases, an encoder may spend more bits in the pole areas due to the rate-distortion optimization (RDO) analysis that is used to select a suitable coding mode. The higher number of bits used for the pole areas causes the quality of viewports in the poles areas to be higher than the quality of viewports in the equator area.

As noted above, one or more systems and methods are described herein for determining one or more adaptive parameters for coding 360-degree video. The one or more adaptive parameters take into account the non-uniform distortion introduced when three-dimensional (e.g., spherical) video data of a 360-degree video is projected to a two-dimensional format (e.g., a equirectangular geometry, one or more planes of a geometry, or the like). For example, the non-uniform distortion property of projection schemes for 360-degree videos can be exploited to improve compression efficiency of 360-degree videos by determining and applying the one or more adaptive parameters to different regions within pictures of the 360-degree videos in proportion to distortion in the different regions.

The one or more adaptive parameters can be used to select a coding mode for coding one or more samples of a picture. For example, using the one or more adaptive parameters, a cost can be determined that is associated with coding one or more samples of a picture using one or more coding modes. The cost can include a rate-distortion cost or other suitable metric for evaluating the trade-offs among different coding modes. The one or more samples can include a pixel, a block of pixels, a row of blocks, or other suitable number of samples of a picture. Using a block of pixels as an example, costs associated with performing each possible coding mode (e.g., one or more inter-prediction modes and/or one or more intra-prediction modes) on the block can be determined, and the coding mode associated with the lowest cost can be selected as the coding mode that will be performed for that block.

A weight can be determined for the one or more samples, and can be used to determine the one or more adaptive parameters for the one or more samples. For instance, the one or more adaptive parameters can include an adaptive weighted distortion, an adaptive weighted quantization parameter (QP) value, and/or an adaptive weighted lambda value. The one or more adaptive parameters for the one or more samples (e.g., the adaptive weighted distortion, adaptive weighted QP value, and/or an adaptive weighted lambda value) can then be used to determine the cost associated with coding the one or more samples using one or more coding modes.

In some cases, a weight can be determined for one or more samples based on a position (e.g., a height or other suitable position) of the one or more samples in the picture, thus taking into account the non-uniform distortion in the picture according to where in the picture the one or more samples are located (e.g., in or near a pole region, in or near an equatorial region, or the like). In some cases, determination of the weight can be based on the resolution of a two-dimensional format with which the one or more samples have been projected (e.g., an equirectangular geometry or other suitable geometry). In some cases, the weight is determined based on the position (e.g., height or other suitable position) of the one or more samples and based on the resolution of the two-dimensional format. In some cases, a normalized weight can be determined for the one or more samples. For example, the weight (based on position and/or resolution) for the one or more samples can be normalized by taking into account the position of the picture and the total weight of the samples of the picture. Such normalization can increase the weights for some samples in the picture and can decrease the weights for other samples in the picture.

As noted above, the adaptive parameters can include one or more of adaptive weighted distortion, adaptive quantization parameter(s) (QPs), and adaptive lambda value(s). The adaptive coding parameters can be used to encode 360-degree video data. The adaptive methods for the three adaptive parameters (e.g., distortion, QP, and/or lambda) can be applied independently or in combinations. For encoding, the coding decision is guided by a general rate-distortion (RD) cost function that optimizes the amount of distortion against an amount of data required to encode the video data. Using such an optimization enables tradeoffs between the numbers of bits used to encode a sample, block, or group of blocks of a picture versus the resulting distortion that is produced by using that number of bits.

An example of an RD cost function is as follows: Cost=D+λR, where the term D represents distortion, the term λ represents lambda values (desired trade-off between distortion and bits), and the term R that represents the amount of bits (sometimes referred to as the Rate). The distortion D indicates a loss in video quality and can be measured as a deviation (or error) between the original sample (e.g., pixel) or block and the reconstructed sample or block after decoding. The distortion D can be measured by relying on a mathematical distance, by taking into account perception mechanisms, or using any other suitable technique. Perceptual metrics correlate well with viewers' perceptual experience, but can be challenging to define due to the complexity of modeling various physiological components involved in the human visual system. Objective quality measures based on mathematical distances are easier to calculate and provide quality tradeoffs between subjective quality and rate used. Illustrative examples of distance-based objective quality metrics for determining distortion D between a source sample or block and a reconstructed sample or block include mean-squared error (MSE), peak-signal-to-noise (PSNR), sum of absolute differences (SAD), sum of square error (SSE), the Hadamard Transformed SAD (SATD), among other suitable techniques. For instance, the SSE is denoted as follows: $\Sigma_{i,j}(S_A(i,j)-S_B(i,j))^2$. As another example, the SAD is denoted as follows: $\Sigma_{i,j}|S_A(i,j)-S_B(i,j)|$. The terms $S_A(i,j)$ and $S_B(i,j)$ denote the $(i,j)^{th}$ sample in blocks A and B (both of the same size), respectively.

The amount of bits R can depend on the accuracy of the prediction. For example, the residual is the difference between the original block value and the predictive block value. The residual is processed by a transform (e.g., a block transform) and is then quantized, as described herein, leading to quantized transform values having a certain number of bits. The bigger the residual value, the more bits that will be needed to represent the difference.

The amount of bits R is measured by multiplying the bit cost by the lambda term λ (called a Lagrange or Lagrangian multiplier, constant, or parameter), which is a non-negative value representing the relationship between bit cost and quality for a particular quality level. The lambda term λ can be constant for all samples and/or blocks in a picture. Changing the value of the lambda term λ enables tradeoffs between rate decreases versus distortion increases. For instance, distortion is minimized with a lambda term λ value of 0, while a large value for the lambda term λ corresponds to rate minimization. A relationship between the lambda term λ and the quantization step size Q has been established as: $\lambda=c*Q^2$. The quantization step size Q is controlled by a quantization parameter (QP). For instance, the QP indicates a quantization step size for a picture during quantization, and controls how much spatial detail is retained from the captured image after quantization. As the QP value becomes smaller (smaller steps), more detail is retained, leading to better video quality and a higher picture size. As QP increases (larger steps), more of the detail is aggregated so that the bitrate drops, leading to loss of quality and a smaller picture size. In some cases, the quantization step size Q is proportional to $2^{(QP-12)/6}$, and the constant of proportionality, c, depends on coding mode decisions.

Minimization of the cost function can be performed for each block of samples (e.g., for each CU) independently and in four stages: (1) coding mode decision (intra-prediction versus inter-prediction); (2) intra prediction mode estimation; (3) motion estimation; and (4) quantization. For example, for each block, a pre-calculation of the cost function (associated with each combination of coding parameters) is performed, where the optimal RD cost for the block is the combination that minimizes the RD cost function.

The general cost function denoted above is updated using the techniques described herein for coding of 360-degree videos. For example, the cost function is updated by introducing a weight w, which can be obtained based on a determined significance (or weight) of pixels in a 360-degree video picture (or frame) in the calculation of the quality of the reconstructed picture. In general, values for the weight w represent the weight (significance of pixels) in a 360-degree picture in the calculation of the quality of the reconstructed picture (after being decoded). The methods described herein use w values based on a weighted spherical peak-signal-to-noise ratio (WS-PSNR). For example, in 360-degree video projected using equirectangular projection (ERP), the w value for each pixel position is based on W(i,j) that is defined as follows:

$$W(i, j) = \cos\left(\left(j - \frac{a}{2} + \frac{1}{2}\right) * \frac{\pi}{a}\right) \quad (1)$$

Where j denotes a height of the pixel position (ranges from 0 to picture height) and a represent a resolution of equirectangular geometry (or format), defined as 2a*a. The height j can be from the bottom of the picture, from the center of the picture, or from any other point in the picture. While height is used herein as an example of a pixel position in the picture, other suitable position designations could also be used to represent the position of the pixel in the picture. In some cases, a weight can be determined for more than one sample (pixel), such as for a block of samples (pixels) and/or a row of blocks of samples (pixels). For instance, if a weight is determined for a block of pixels, the location of the top-left sample, the location of the middle sample, the location of the bottom sample, or the location of other suitable sample in the block can be used as the j height position of the block. In the event a weight is determined for a row of blocks or a row of samples, each sample and/or block in the row will have the same j height position. For example, if a weight is determined for a row of blocks, the top-left sample location (or other suitable location) in each block will be used as the j location.

The weight equation (1) above determines a weight of a sample (e.g., a pixel) based on a height of the pixel. When calculating a weight for a block of pixels (e.g., a block of pixels having a size of 8 pixels×8 pixels), weight values can be determined for all or some of the pixels in the block. In one illustrative example, one weight value can be determined for each pixel row in a block (e.g., eight weight values for an 8×8 block). For example, if a block is located at the top-left corner of the picture and has an 8×8 size, each pixel row from row 0 to row 7 will have a weight value, resulting in eight total weight values for the block. In some cases, one weight value can be determined for each block. Continuing with the example above using an 8×8 block with eight weight values (one weight value for each row of pixels in the block), the eight weight values can be transformed into a single weight value. In one illustrative example, the eight weight values can be averaged. A similar technique can be performed to determine one or more weight values for a row of blocks.

Figure 5:
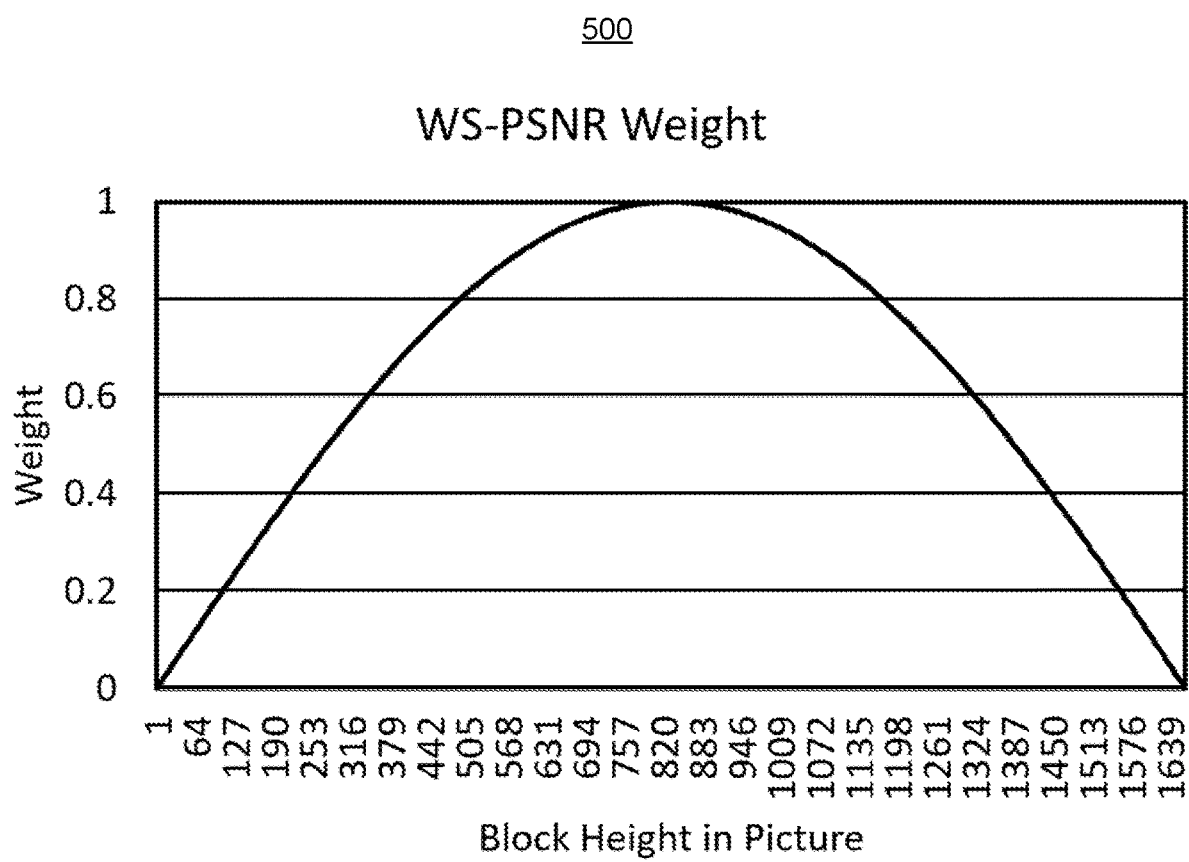
FIG. 5 is a graph illustrating an example of weighted spherical peak signal-to-noise ratio (WS-PSNR) weights, in accordance with some examples.

Using the formulation in equation (1) above, the w value for each pixel (or for each block of samples, or for each row of blocks or samples) height position ranges between 0 and 1. FIG. 5 is a graph 500 illustrating an example of weighted spherical peak signal-to-noise ratio (WS-PSNR) weights. The graph 500 in FIG. 5 illustrates a weight w value for each pixel height for a 360-degree video picture coded with resolution 3328×1664. By determining the weight based on the height (j) of a pixel in the picture, the distortion at each location is taken into account. As shown in FIG. 5, the pixels (or blocks, rows of blocks, or rows of pixels) in the pole regions of the picture have lower weights than the equatorial regions. The pole regions are the regions of the picture with the lower and higher heights. For instance, the pixels with a height of 1 and the pixels with a height of 1663 have the lowest weights (e.g., weight values closer to 0, such as 0.01, or even lower in some cases), which are the pixels with high amount of distortion. The pixels in the middle of the picture (with a height of approximately 832 pixels), which are the pixels with the least amount of distortion, have the highest weight of 1. As described in more detail below, the weight for a pixel (or a block, row of blocks, or row of pixels) can be used to modify the cost determination for the pixel (block or row).

In some cases, a normalization process can be applied to the WS-PSNR weighting formula (in equation (1)) to take into account the resolution of the 360-degree video. For equirectangular projection, the normalized w value can be computed as follows:

Let sum of weight be $$\text{Total\_weight} = \sum_{j=0}^{PictureHeight} W(i, j),$$

the normalized weight is defined as:

$$W'(i, j) = \frac{W(i, j)}{\text{Total\_weight}} * \text{Picture Height} \quad (2)$$

Figure 6:
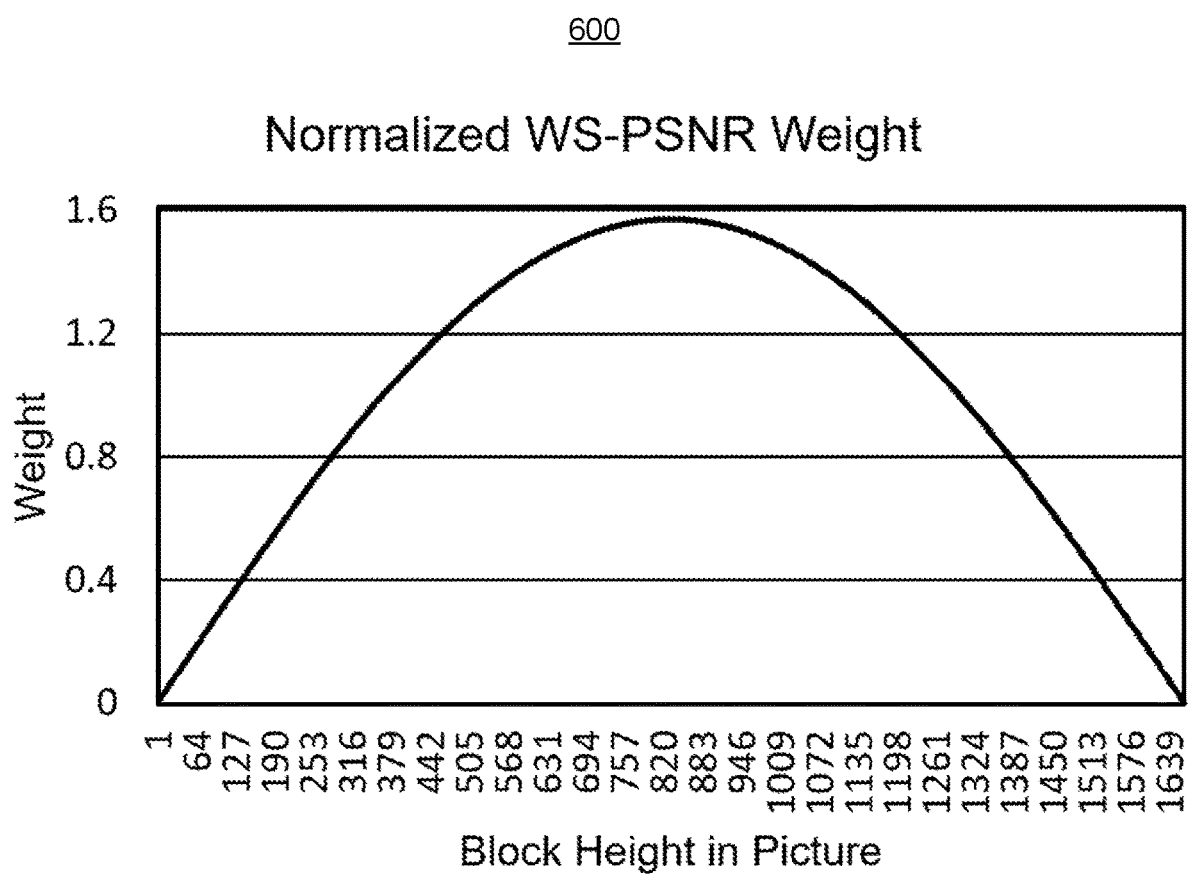
FIG. 6 is a graph illustrating an example of normalized WS-PSNR weights, in accordance with some examples.

By using the above formulation in equation (2), the w' value for each pixel height position ranges between 0 and 1.570795. FIG. 6 is a graph 600 illustrating an example of normalized WS-PSNR weights. The graph 600 in FIG. 6 illustrates the normalized w' value for each pixel height for 360-degree video picture coded with resolution 3328×1664. As shown, the normalized weights w' for pixels in the equatorial region can be increased (as compared to the WS-PSNR weighting in FIG. 5), while the normalized weights w' for pixels in the pole regions are kept low. For example, the pixels in the middle of the picture (with a height of approximately 832 pixels) having the least amount of distortion have a normalized weight w' values of 1.570795, while the pixels in the pole regions have normalized weight w' values closer to 0.

The weight w or normalized weight w' can then be used to determine the adaptive parameters for samples of a picture (e.g., a pixel, a block of pixels, a row of blocks, or a row of pixels). For example, as noted above, the weight w and normalized weight w' represent the significance (weight) of each of one or more of the pixels in a 360-degree picture in the calculation of the quality of a reconstructed picture, and thus can be used to scale or weight certain parameters affecting the general cost function. For instance, the weight w or the normalized weight w' can scale the distortion D in the general cost function. Using such a formulation, the cost function for 360-degree video based on adaptive weighted distortion can be defined as follows:

$$Cost = wD + \lambda R \qquad (3)$$

The weight w term can be replaced with w' when the normalized weight w' is used. By having higher weights for the equatorial regions as compared to the pole regions (e.g., as shown in the graph 500 in FIG. 5 and the graph 600 in FIG. 6), the non-uniform distortion in the picture can be equalized from the equatorial areas to the pole areas. For example, using the weights shown in FIG. 5 as an example, the weight in the middle of the equator area (at a pixel height j of 832) will be at or near a 1 value, in which case the distortion in those areas may not be modified (e.g., 1*D=D). As the pixel locations get closer and closer to the pole areas, the weight w will become smaller, thus lessening the effect of the higher distortion of those pixels on the cost calculation. This makes the RD optimization decision less sensitive to the distortion difference between the equatorial regions and the pole regions, allowing the RD optimization decision to be affected uniformly by all samples in the picture.

The weighted distortion can also lower the number of bits that will be used for coding a sample, block, or row of blocks. For example, as noted above, when the distortion is decreased for the pole areas (due to lower weight values), the RD optimization (RDO) decision is made less sensitive to the distortion difference. Lessening the effect of the distortion in the pole regions can cause the codec to choose a different coding mode that uses fewer bits than a coding mode that would be used if the distortion was not weighted. For example, there are 35 possible intra modes that can be tested to determine which intra mode to use for a current block. In one illustrative example, the RDO analysis can determine a distortion (D) of 999 and a number of bits (R) of 25 for an intra mode 0, and can determine a distortion (D) of 500 and a number of bits (R) of 30 for an intra mode 1. The cost comparison between the intra mode 0 and the intra mode 1 will be dominated by the high distortion of mode 0. For instance, assuming a fixed lambda value of 1 and without using any weighted distortion, the cost for the intra mode 0 will be 1,024 (Cost=999 (distortion D)+25 bits (R)=1,025), and the cost for the intra mode 1 will be 530 (Cost=500 (distortion D)+30 bits (R)=530). The RDO analysis will choose the intra mode 1 in such a scenario even in view of the higher bit cost for performing the intra mode 1 as compared to the intra mode 0. In such a scenario, the codec will use 30 bits instead of 25 bits.

It is desirable not to use so many bits for the pole areas of a picture because these areas are more difficult to code (due to higher distortion in the pole areas of 360-degree video pictures projected from a 3D format to a 2D format, as described above). The weight w used to generate the adaptive weighted distortion will help to reduce the number of bits used in the pole areas because the weight w values for the samples, blocks, or rows of blocks in the pole areas are much smaller as compared to the weight w values for the equatorial areas, thus reducing the significance of the higher distortion (D) values in the pole areas. Returning to the example using intra model 0 and intra mode 1 from above, but using the adaptive weighted distortion, a weight value w of 0.01 can be determined for a block in a pole region of a picture. In such an example, the cost for the intra mode 0 will be 34.99 (Cost=0.01*999+25 bits (R)=34.99), and the cost for the intra mode 1 will be 35 (Cost=0.01*500+30 bits (R)=35). In this example, the RDO analysis will choose the intra mode 0, which uses fewer bits than intra mode 1. In some examples, the cost can be rounded using a rounding technique. In one illustrative example, a floor operation can be used to round any decimal value to zero, in which case the 34.99 cost value would be rounded to a value of 34.

For a block-based encoding scheme, the adaptive weighted distortion can be computed either per pixel, per block, or per block row (e.g., in case of equirectangular projection). For example, an adaptive weighted distortion can be determined for each block or for each row of blocks. As used herein with respect to adaptive parameter determination, the term block can refer to a macroblock (MB) or other block for the AVC coding scheme, a coding unit (CU), a coding tree unit (CTU), or other block for HEVC coding scheme, and any equivalent block concept in other coding schemes.

In some examples, the weight w or the normalized weight w' can scale the lambda term λ in the general cost function, which can be referred to as an adaptive lambda, λ' (also referred to as adaptive weighted lambda). The adaptive lambda λ' can be derived from the picture lambda λ by scaling the lambda term λ with weight w, as follows:

$$\lambda' = \frac{1}{w}\lambda \qquad (4)$$

Using the adaptive lambda λ', the cost function for 360-degree video based on adaptive lambda λ' can be defined as follow:

$$Cost' = D + \frac{1}{w}\lambda R \qquad (5)$$

The weight w term can be replaced with w' when the normalized weight w' is used. As can be seen from equation (5), the higher the value of the weight w is, the lower the value of the lambda term λ will be. The smaller weight w values in the pole areas (as shown in FIG. 5 and FIG. 6) cause the lambda λ value to become bigger for the pole areas. As the lambda becomes bigger, fewer bits will be spent in these areas, and the effect will be that the R will become smaller. For instance, as described above, large values for the lambda term λ correspond to rate minimization. The effect of larger lambda values in coding is that, as the lambda values become bigger, the codec will assign fewer bits. For example, as the lambda value increases, the codec will apply higher QP values, which corresponds to higher quantization step values. When the QP is higher, the residual will be quantized with higher QP (corresponding to a coarser quantization), resulting in fewer bits being needed to code that block. Using lower weight values for the pole areas that have higher distortion will minimize the higher bit allocations that are typically assigned for these areas. As described above, because the poles areas have more distortion than the equatorial regions, the codec assigns more bits to these areas because they tend to be more difficult to code. For example, in the areas with higher distortion (e.g., more curved lines), the prediction will be less accurate, leading to higher residuals. A larger number of bits are needed to represent bigger residual values. Using lower weight values for the pole areas increases the lambda values, thus increasing the QP values and lowering the number of bits allocated to these areas. Such a lowering of the bits used for the pole areas is beneficial due to these areas being difficult to code.

In some cases, the adaptive weighted distortion and the adaptive weighted lambda λ' can both be used, in which case the cost function becomes:

$$\text{Cost} = wD + \frac{1}{w}\lambda R \qquad (6)$$

For a block-based encoding scheme, the adaptive lambda λ' can be computed and updated per block or block row (e.g., in case of equirectangular projection). For example, an adaptive lambda λ' can be determined for each block or for each row of blocks.

In some examples, the weight w or the normalized weight w' can be used to update the QP value, which can be referred to as an adaptive quantization parameter and denoted QP' (also referred to as adaptive weighted QP'). For example, when weight w is introduced into the cost function for 360-degree video, a quantization value (QP value) can also be updated accordingly. The adaptive weighted quantization (QP') value can be computed as:

$$QP' = QP - 3*\log_2(w) \qquad (7)$$

Where QP' denotes the adaptive weighted quantization parameter and QP denotes the original quantization parameter. The weight w term can be replaced with w' when the normalized weight w' is used.

As indicated above, the adaptive QP' can be determined for a sample (pixel), a block, or row of blocks based on the location in the picture of the sample, block, or row of blocks. For example, the adaptive QP' is coarser (higher QP and thus higher quantization step sizes) for samples, blocks, or rows of blocks in the pole areas, while there are lower QP' values for samples, blocks, or rows of blocks in the equator area. In one illustrative example, the adaptive QP' is equal to the original QP when w=1 due to log base 2 of 1 being equal to 0. In cases when normalized weights are used, the w can be equal to a value greater than 1, in which case the adaptive QP' value for samples, blocks, or rows of blocks in or near the equatorial regions can be less than the original QP value. In one illustrative example, given an original QP value of 30 and a weight value of 1.58 (e.g., for a block in the middle of a picture), the log base 2 of the weight will be around 0.6599 and the adaptive QP' value will be equal to approximately 28.02 (QP'=30−(3*0.6599)=28.02).

Similar to the adaptive lambda λ', the smaller weight w values in the pole areas (as shown in FIG. 5 and FIG. 6) cause the adaptive weighted QP' value to become bigger for the pole areas. For instance, the log base 2 ($\log_2$) of a number between 0 and 1 generates a negative value, where smaller values for w lead to higher log base 2 results. In one illustrative example, assuming a QP value of 30, for a weight value w of 0.1 (e.g., for a pole area of a picture), the log base 2 value is approximately −3.322, which results in an adaptive QP' value of approximately 39.966 (QP'=30−(3*−3.322)=39.966). As the adaptive QP' value becomes bigger in the pole areas (due to lower weights), fewer bits will be spent in these areas, and the effect will be that the R will become smaller. For example, the codec will apply the higher QP values, which corresponds to higher quantization step values. When the QP is higher, the residual will be quantized with higher QP (corresponding to a coarser quantization), resulting in fewer bits being needed to code that block. Using lower weight values for the pole areas that have higher distortion will minimize the higher bit allocations that are typically assigned for these areas. For example, the codec assigns more bits to the poles areas with higher distortion than the equatorial regions because they tend to be more difficult to code. For instance, prediction is typically less accurate in the pole areas with the higher distortion, leading to higher residuals and a larger number of bits being needed to represent the higher residuals. Using lower weight values for the pole areas increases the QP values and thus lowers the number of bits allocated to these areas. Such a lowering of the bits used for the pole areas is beneficial due to these areas being difficult to code.

In some cases, the RD cost calculation may not need to be modified when the adaptive QP' is determined using the weight. For example, in some cases, the standard cost equation can be utilized (cost=D+λR) to determine which coding mode to use for a current pixel or block. In such cases, the QP will be modified for a given sample, block, or row of blocks (based on the weight), which will affect the cost calculation due to the number of bits (R) changing based on the resulting QP' value (e.g., higher QP' value leads to fewer bits being used). In some examples, the adaptive QP' can be used in combination with the adaptive weighted distortion and/or the adaptive lambda λ', in which case one of the modified RD cost equations (3), (5), or (6) from above can be utilized.

Figure 7:
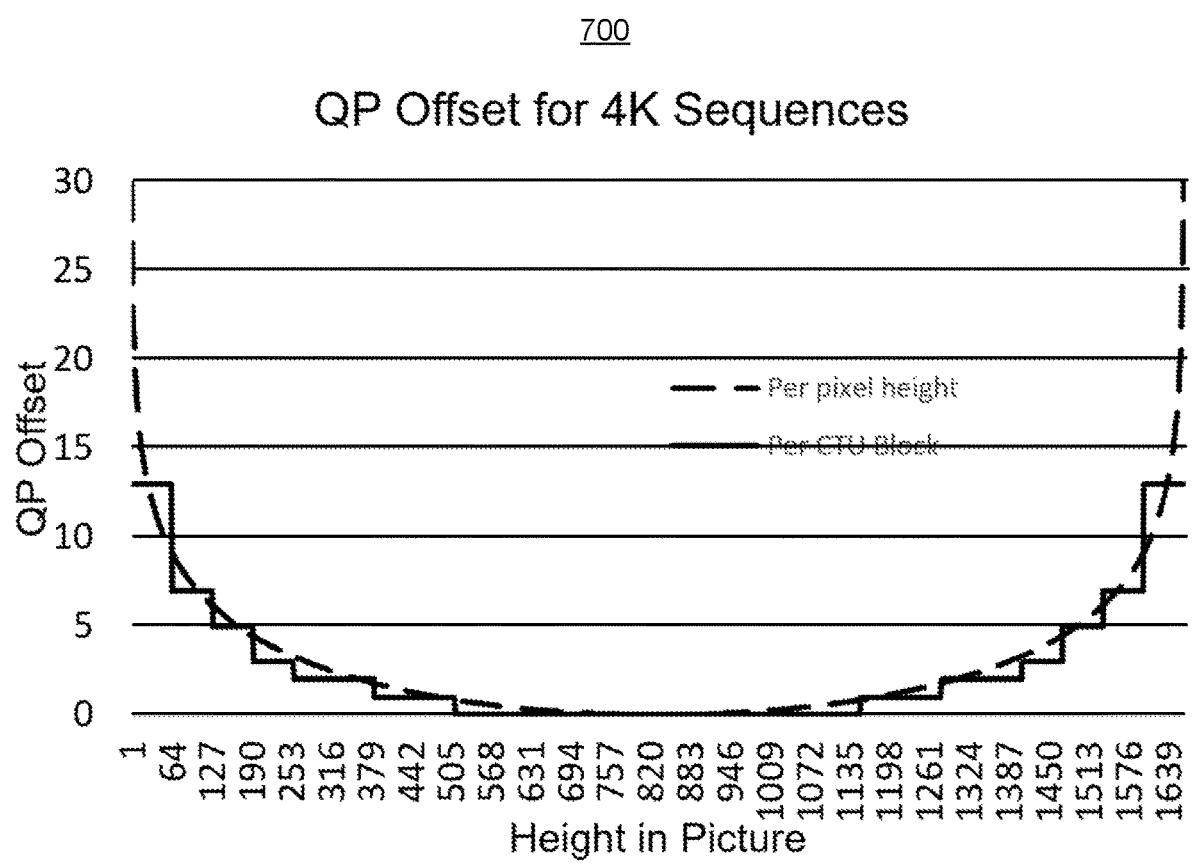
FIG. 7 is a graph illustrating an example of quantization parameter (QP) offsets for 4K video sequences based on WS-PSNR weights, in accordance with some examples.
Figure 8:
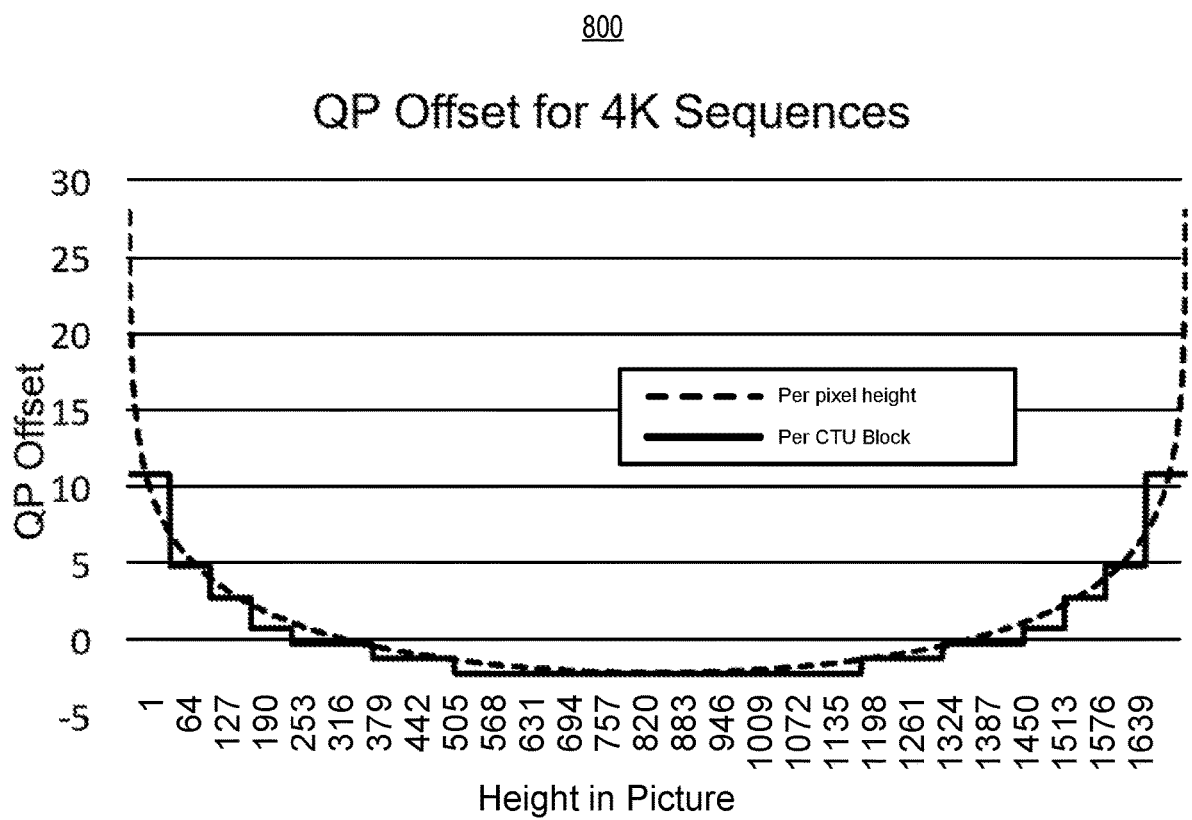
FIG. 8 is a graph illustrating an example of quantization parameter (QP) offsets for 4K video sequences based on normalized WS-PSNR weights, in accordance with some examples.

FIG. 7 is a graph 700 illustrating an example of quantization parameter (QP) offsets for 4K video sequences based on WS-PSNR weights. FIG. 8 is a graph 800 illustrating an example of QP offsets for 4K video sequences based on normalized WS-PSNR weights. By using the above formulation in equation (7), the QP offset (QP'−QP) (or delta QP) for each pixel height and CTU block for 360-degree video coded with resolution 3328×1664 is shown in the graphs 700 and 800. For example, the graph 700 in FIG. 7 shows QP offset based on WS-PSNR weight, and the graph 800 in FIG. 8 shows QP offset based on normalized WS-PSNR weight.

It can be seen from the graph 700 in FIG. 7 that if the non-normalized weight w is used, the QP offset in the middle regions of a picture will be zero, meaning that the original QP is used for these regions. As the samples or blocks get closer to the sides of the graph (corresponding to the pole regions), the QP offset will become higher, indicating that the QP' is higher than the original QP for regions in or close to the poles. For example, given an original or base QP of 30, the pixels or blocks in the equatorial regions (e.g., pixels having approximate heights between 505 pixels and 1135 pixels), will use the base QP value of 30 due to the offset being equal to 0. As the pixels or blocks get outside of the equatorial range (e.g., pixels having heights lower than 505 and higher than 1135), the offset will become bigger. For example, for a pixel having a height (j value) of 190, the offset is 5, in which case the QP' will have a value of 35 (QP+offset=QP').

It can be seen from the graph 800 in FIG. 8 that if the normalized weight w' is used, the QP offset in the middle regions of a picture will be less than zero, meaning that the QP' values are less than the original QP for these regions. Using the normalized weights w' thus boosts the quality for the samples and/or blocks in the equatorial regions by reassigning the behavior of the encoder to use more bit for these regions and use fewer bits for the regions in or near the poles of the picture. This can effectively take the bits assigned from the poles areas and reassign these bits to the equatorial areas. Such a solution can increase the overall PSNR (when the quality of the coded pictures is calculated).

For a block-based encoding scheme, the adaptive weighted QP' can be computed and updated per block or block row (e.g., in case of equirectangular projection). For example, an adaptive QP' can be determined for each block or for each row of blocks.

In AVC and HEVC, QP values and their deltas are signaled in the bitstream. In some cases, in the case of adaptive QP usage, the QP changes due to weight changes do not have to be signaled explicitly because they can be derived from a block's position in the picture and a weight map. A weight map can include weight for each pixel location in a picture. In order to support this feature, a signaling to indicate that the encoded bitstream has been encoded with weighted distortion QPs can be included in a parameter set (e.g., in a video parameter set (VPS), a sequence parameter set (SPS), a picture parameter set (PPS), or the like), in a supplemental enhancement information (SEI) message, or any other suitable format. The signaling can include a syntax element, a syntax variable, a syntax structure, a flag, and/or any other suitable signaling mechanism. Upon receiving the bitstream and determining (based on the signaling) that the bitstream was encoded by using adaptive QP, a decoder can or shall compute the updated one or more QPs accordingly.

FIG. 9 is a flowchart illustrating an example of a process 900 for processing 360-degree video data using the techniques described herein. At block 902, the process 900 includes obtaining a picture of the 360-degree video data. The picture includes samples projected from a three-dimensional (3D) format to a two-dimensional (2D) format. In some examples, the 2D format is an equirectangular geometry. For instance, pixels of a 360-degree video picture (or frame or image) can be projected to the equirectangular geometry using an equirectangular projection technique, as described herein. In other examples, the 2D format is another format to which 360-degree video data can be projected. Other formats to which the 360-degree video data can be projected include planes or faces of a truncated square pyramid (TSP), a cube, a cylinder, a dodecahedron, and/or other suitable geometry.

At block 904, the process 900 includes determining a weight value for at least one sample of the picture. The weight value is determined based at least on a position of the at least one sample in the picture. In one illustrative example, the weight value can be determined using equation (1) above. For example, the position can include a height of the at least one sample in the picture (e.g., the height j used in equation (1) above). In some examples, the weight value is further determined based on a resolution of the two-dimensional format (e.g., the a used in equation (1) above).

In some examples, the weight value includes a normalized weight value. In such examples, the process 900 includes determining a normalized weight value for the at least one sample of the picture. The normalized weight value can be determined based on a sum of weights of the samples in the picture and based on a height of the picture. In one illustrative example, the normalized weight value can be determined using equation (2) above.

In some examples, the at least one sample is a pixel. In some cases, a weight can be determined for more than one sample (e.g., pixel), such as for a block of pixels and/or a row of blocks of pixels. In some examples, the at least one sample is a block of pixels, such as a macroblock, a coding tree unit (CTU), a coding unit or coding block, a prediction unit or prediction block, or other suitable block of pixels. For instance, if a weight is determined for a block of pixels, the location of the top-left sample, the location of the middle sample, the location of the bottom sample, or the location of other suitable samples in the block can be used as the position (e.g., the j height position) of the block in the picture. In some examples, the at least one sample is a row of blocks of pixels. For instance, the row can include all blocks in a row of the picture, or less than all blocks in a row of the picture. If a weight is determined for a row of blocks, each block in the row can have the same position (e.g., j height position) in the picture. For example, if a weight is determined for a row of blocks, the top-left sample location (or other suitable location) in each block will be used as the j height position.

At block 906, the process 900 includes determining at least one adaptive parameter for the at least one sample using the determined weight value. In some cases, when the weight value includes a normalized weight value, the at least one adaptive parameter is determined for the at least one sample using the determined normalized weight value. The at least one adaptive parameter can include an adaptive weighted distortion, an adaptive weighted quantization parameter (QP) value, an adaptive weighted lambda value, or any combination thereof.

At block 908, the process 900 includes determining a cost associated with coding the at least one sample using one or more coding modes. The cost is determined using the at least one adaptive parameter determined for the at least one sample. For instance, in some examples, the at least one adaptive parameter includes the adaptive weighted distortion. The adaptive weighted distortion can include a distortion of the at least one sample multiplied by the determined weight value. The distortion of the at least one sample can include a difference between an original value of the at least one sample and a reconstructed value of the at least one sample. In one illustrative example, the cost can be determined using the adaptive weighted distortion using the equation (3) above.

In some examples, the at least one adaptive parameter includes the adaptive weighted lambda value. The adaptive weighted lambda value includes a lambda value of the at least one sample modified by the determined weight value. The lambda value of the at least one sample can include a Lagrange constant representing a trade-off between distortion and a number of bits. In one illustrative example, the adaptive weighted lambda value (denoted as $\lambda'$ above) can be determined using equation (4) above. In one illustrative example, the cost can be determined using the weighted lambda using the equation (5) above.

In some cases, the at least one adaptive parameter includes the adaptive weighted distortion and the adaptive weighted lambda value. In one illustrative example, the cost can be determined using the adaptive weighted distortion and the adaptive weighted lambda using the equation (6) above.

In some examples, the at least one adaptive parameter includes the adaptive weighted QP value. The adaptive weighted QP value includes a QP value of the at least one sample modified by the determined weight value. In one illustrative example, the adaptive weighted QP value (denoted as QP' above) can be determined using equation (7) above. In various examples, the cost can be determined using the adaptive weighted QP value using any of the cost equations noted above. For example, the cost function Cost=D+$\lambda$R can be used when the adaptive weighted QP value is used without other adaptive parameters. Any of the other cost functions in equations (3), (5), or (6) can be used when one or more of the adaptive weighted distortion and/or the adaptive weighted lambda are used. In some cases, the at least one adaptive parameter includes the adaptive weighted distortion and the adaptive weighted QP value. In one illustrative example, the cost equation (3) can be used to determine the cost when an adaptive weighted QP value and an adaptive weighted distortion are both used. In some cases, the at least one adaptive parameter includes the adaptive weighted lambda value and the adaptive weighted QP value. In one illustrative example, the cost equation (5) can be used to determine the cost when an adaptive weighted QP value and an adaptive weighted lambda are both used.

In some examples, the at least one adaptive parameter includes the adaptive weighted distortion, the adaptive weighted lambda value, and the adaptive weighted QP value. In one illustrative example, the cost equation (6) can be used to determine the cost when an adaptive weighted QP value, an adaptive weighted distortion, and an adaptive weighted lambda are both used.

In some examples, the cost is a rate-distortion optimization (RDO) cost. For instance, the process 900 can include determining a coding mode for encoding the at least one sample based on the cost that is determined using the adaptive parameters. The RDO cost can be considered a modified RDO cost relative to the traditional RDO cost (Cost=D+λR) that does not take into account any weight values. In such examples, the process 900 can include encoding the at least one sample using the determined coding mode.

In some examples, the process 900 may be performed by a computing device or an apparatus, such as the encoding device 104, the decoding device 112, or any other computing device. In some cases, the computing device or apparatus may include a processor, microprocessor, microcomputer, or other component of a device that is configured to carry out the steps of process 900. In some examples, the computing device or apparatus may include a camera configured to capture video data (e.g., a video sequence) including video pictures. For example, the computing device may include a camera device, which may or may not include a video codec. The camera can be configured to capture 360-degree video, such as spherical video pictures. In some examples, the computing device may include a mobile device with a camera that can capture 360-degree video (e.g., a camera device such as a digital camera, an IP camera or the like, a mobile phone or tablet including a camera, or other type of device). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or other network data.

Process 900 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program that includes instructions executable by one or more processors. The computer-readable or machine-readable storage medium may be non-transitory.

The video data captured by a camera (e.g., a fisheye camera, or other suitable camera or cameras) can be coded to reduce the amount of data needed for transmission and storage. In some examples, a system includes a source device that provides encoded video data to be decoded at a later time by a destination device. In particular, the source device provides the video data to the destination device via a computer-readable medium. The source device and the destination device may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may include any type of medium or device capable of moving the encoded video data from the source device to the destination device. In one example, the computer-readable medium may include a communication medium to enable the source device to transmit encoded video data directly to the destination device in real-time. The encoded video data may be modulated according to a communication standard, such as a wireless communication protocol, and transmitted to the destination device. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the destination device.

In some examples, encoded data may be output from output interface to a storage device. Similarly, encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS)

devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example, the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further example, the video source may generate computer graphics-based data as the source video, or a combination of live video, archived video, and computer-generated video. In some cases, if the video source is a video camera, the source device and the destination device may form so-called camera phones or video phones capable of communicating using wireless applications. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may be any of a variety of display devices such as a cathode ray tube (CRT), a liquid crystal display (LCD), a plasma display, an organic light emitting diode (OLED) display, or another type of display device. Various embodiments of the application have been described.

Figure 10:
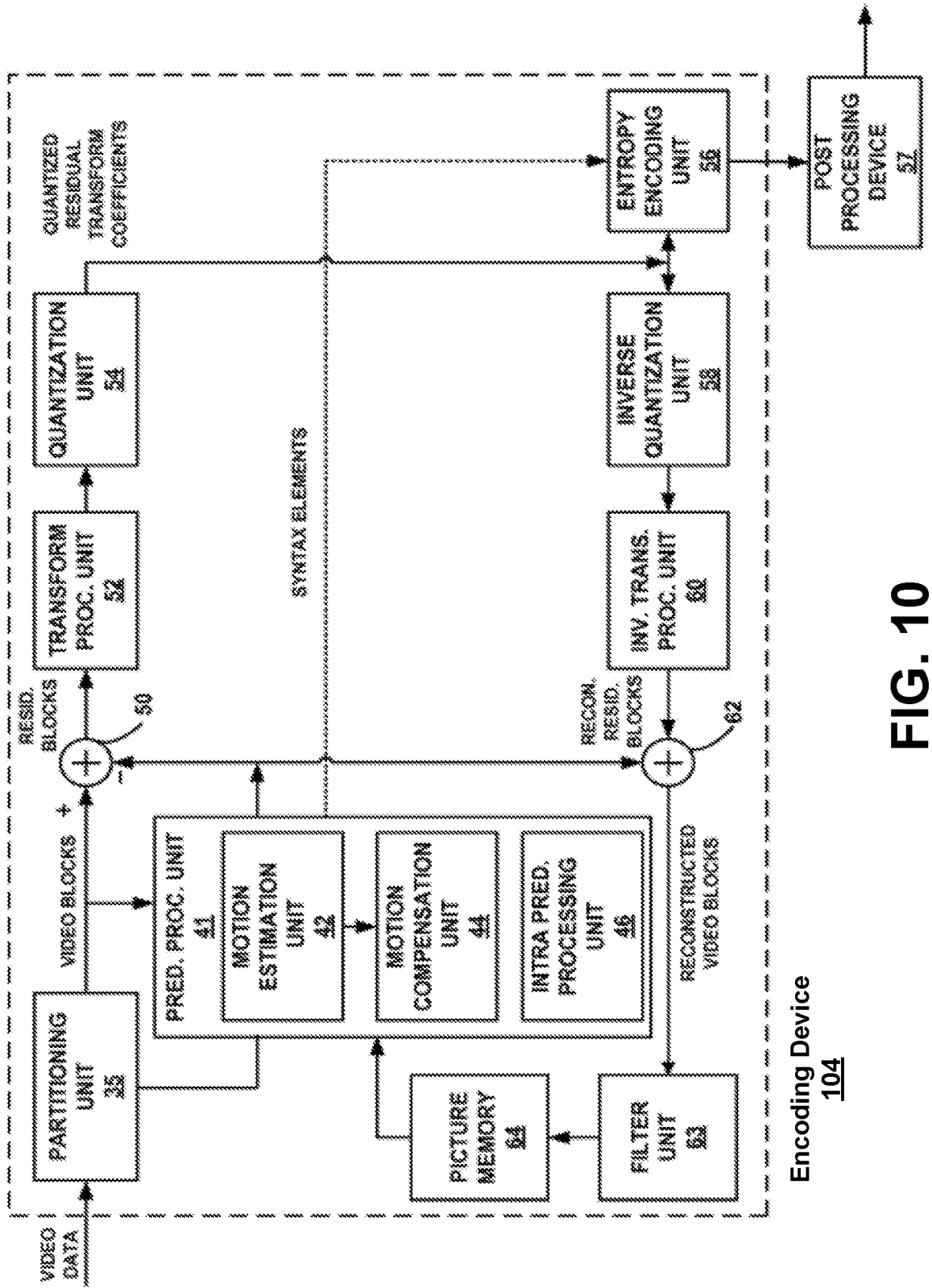
FIG. 10 is a block diagram illustrating an example video encoding device, in accordance with some examples.
Figure 11:
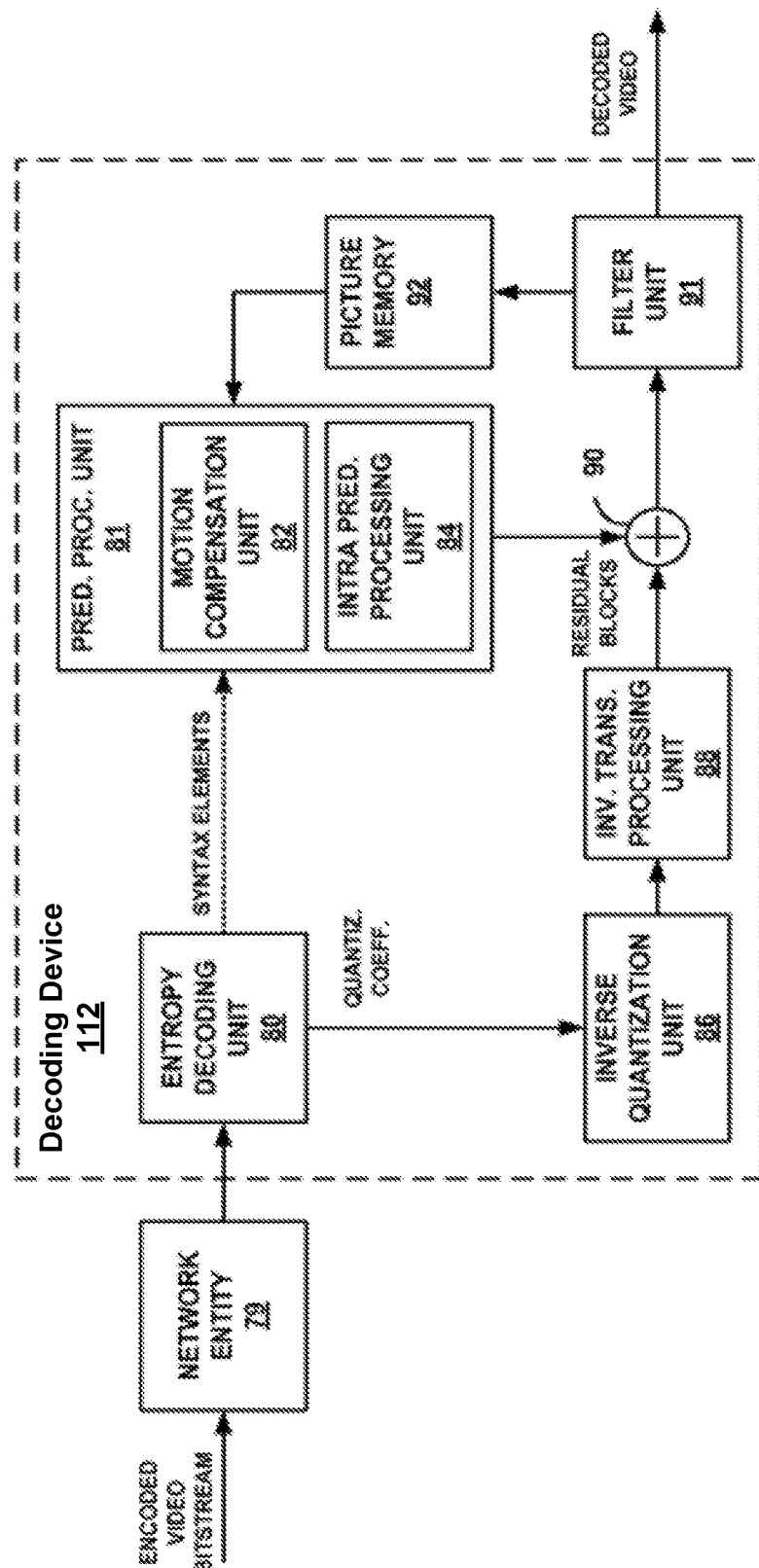
FIG. 11 is a block diagram illustrating an example video decoding device, in accordance with some examples.

Specific details of the encoding device 104 and the decoding device 112 are shown in FIG. 10 and FIG. 11, respectively. FIG. 10 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). The encoding device 104 may perform intra-prediction and inter-prediction coding of video blocks within video slices. As previously described, intra-coding relies, at least in part, on spatial prediction to reduce or remove spatial redundancy within a given video picture. Inter-coding relies, at least in part, on temporal prediction to reduce or remove temporal redundancy within adjacent or surrounding pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, the encoding device 104 also includes inverse quantization unit 58, inverse transform processing unit 60, and summer 62. The filter unit 63 is intended to represent one or more loop filters such as a deblocking filter, an adaptive loop filter (ALF), and a sample adaptive offset (SAO) filter. Although the filter unit 63 is shown in FIG. 10 as being an in loop filter, in other configurations, the filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by the post processing device 57.

As shown in FIG. 10, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). The prediction processing unit 41 may select one of multiple possible coding modes, such as one of multiple intra-prediction coding modes or one of multiple inter-prediction coding modes, for the current video block based on error results (e.g., coding rate and the level of distortion, or the like). The prediction processing unit 41 may provide the resulting intra- or inter-coded block to the summer 50 to generate residual block data and to the summer 62 to reconstruct the encoded block for use as a reference picture.

The intra-prediction processing unit 46 within the prediction processing unit 41 may perform intra-prediction coding of the current video block relative to one or more neighboring blocks in the same picture or slice as the current block to be coded in order to provide spatial compression. The motion estimation unit 42 and the motion compensation unit 44 within prediction processing unit 41 perform inter-predictive coding of the current video block relative to one or more predictive blocks in one or more reference pictures to provide temporal compression.

The motion estimation unit 42 may be configured to determine the inter-prediction mode for a video slice according to a predetermined pattern for a video sequence. The predetermined pattern may designate video slices in the sequence as P slices, B slices, or GPB slices. The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example, may indicate the displacement of a prediction unit (PU) of a video block within a current video picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in the picture memory 64. For example, the encoding device 104 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the picture memory 64. The motion estimation unit 42 sends the calculated motion vector to entropy the encoding unit 56 and the motion compensation unit 44.

Motion compensation, performed by the motion compensation unit 44, may involve fetching or generating the predictive block based on the motion vector determined by motion estimation, possibly performing interpolations to sub-pixel precision. Upon receiving the motion vector for the PU of the current video block, the motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. The summer 50 represents the component or components that perform this subtraction operation. The motion compensation unit 44 may also generate syntax elements associated with the video blocks and the video slice for use by the decoding device 112 in decoding the video blocks of the video slice.

The intra-prediction processing unit 46 may intra-predict a current block, as an alternative to the inter-prediction performed by the motion estimation unit 42 and motion the compensation unit 44, as described above. In particular, the intra-prediction processing unit 46 may determine an intra-prediction mode to use to encode a current block. In some examples, the intra-prediction processing unit 46 may encode a current block using various intra-prediction modes, e.g., during separate encoding passes, and the intra-prediction unit processing 46 may select an appropriate intra-prediction mode to use from the tested modes. For example, the intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. The intra-prediction processing unit 46 may calculate ratios from the distortions and rates for the various encoded blocks to determine which intra-prediction mode exhibits the best rate-distortion value for the block.

In any case, after selecting an intra-prediction mode for a block, the intra-prediction processing unit 46 may provide information indicative of the selected intra-prediction mode for the block to the entropy encoding unit 56. The entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include intra-prediction mode index tables and modified intra-prediction mode index tables (also referred to as codeword mapping tables).

After the prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to the transform processing unit 52. The transform processing unit 52 transforms the residual video data into residual transform coefficients using a transform, such as a discrete cosine transform (DCT) or a conceptually similar transform. The transform processing unit 52 may convert the residual video data from a pixel domain to a transform domain, such as a frequency domain.

The transform processing unit 52 may send the resulting transform coefficients to the quantization unit 54. The quantization unit 54 quantizes the transform coefficients to further reduce bitrate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively, the entropy encoding unit 56 may perform the scan.

Following quantization, the entropy encoding unit 56 entropy encodes the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by the entropy encoding unit 56, the encoded bitstream may be transmitted to the decoding device 112, or archived for later transmission or retrieval by the decoding device 112. The entropy encoding unit 56 may also entropy encode the motion vectors and the other syntax elements for the current video slice being coded.

The inverse quantization unit 58 and the inverse transform processing unit 60 apply inverse quantization and inverse transformation, respectively, to reconstruct the residual block in the pixel domain for later use as a reference block of a reference picture. The motion compensation unit 44 may calculate a reference block by adding the residual block to a predictive block of one of the reference pictures within a reference picture list. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reference block for storage in the picture memory 64. The reference block may be used by the motion estimation unit 42 and the motion compensation unit 44 as a reference block to inter-predict a block in a subsequent video picture.

In this manner, the encoding device 104 of FIG. 10 represents an example of a video encoder configured to determine adaptive parameters for video coding, as described above. For instance, the encoding device 104 may perform any of the techniques described herein, including the processes described above with respect to FIG. 9. In some cases, some of the techniques of this disclosure may also be implemented by the post processing device 57.

FIG. 11 is a block diagram illustrating an example the decoding device 112. The decoding device 112 includes an entropy decoding unit 80, prediction processing unit 81, inverse quantization unit 86, inverse transform processing unit 88, summer 90, filter unit 91, and picture memory 92. The prediction processing unit 81 includes the motion compensation unit 82 and the intra prediction processing unit 84. The decoding device 112 may, in some examples, perform a decoding pass generally reciprocal to the encoding pass described with respect to the encoding device 104 from FIG. 10.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. The network entity 79 may or may not include the encoding device 104. Some of the techniques described in this disclosure may be implemented by the network entity 79 prior to the network entity 79 transmitting the encoded video bitstream to the decoding device 112. In some video decoding systems, network entity 79 and the decoding device 112 may be parts of separate devices, while in other instances, the functionality described with respect to the network entity 79 may be performed by the same device that includes the decoding device 112.

The entropy decoding unit 80 of the decoding device 112 entropy decodes the bitstream to generate quantized coefficients, motion vectors, and other syntax elements. The entropy decoding unit 80 forwards the motion vectors and other syntax elements to the prediction processing unit 81. The decoding device 112 may receive the syntax elements at the video slice level and/or the video block level. The entropy decoding unit 80 may process and parse both fixed-length syntax elements and variable-length syntax elements in or more parameter sets, such as a VPS, SPS, and PPS.

When the video slice is coded as an intra-coded (I) slice, the intra prediction processing unit 84 of the prediction processing unit 81 may generate prediction data for a video block of the current video slice based on a signaled intra-prediction mode and data from previously decoded blocks of the current picture. When the video frame is coded as an inter-coded (i.e., B, P or GPB) slice, the motion compensation unit 82 of the prediction processing unit 81 produces predictive blocks for a video block of the current video slice based on the motion vectors and other syntax elements received from the entropy decoding unit 80. The predictive blocks may be produced from one of the reference pictures within a reference picture list. The decoding device 112 may construct the reference frame lists, List 0 and List 1, using default construction techniques based on reference pictures stored in the picture memory 92.

The motion compensation unit 82 determines prediction information for a video block of the current video slice by parsing the motion vectors and other syntax elements, and uses the prediction information to produce the predictive blocks for the current video block being decoded. For example, the motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation unit 82 may also perform interpolation based on interpolation filters. The motion compensation unit 82 may use interpolation filters as used by the encoding device 104 during encoding of the video blocks to calculate interpolated values for sub-integer pixels of reference blocks. In this case, the motion compensation unit 82 may determine the interpolation filters used by the encoding device 104 from the received syntax elements, and may use the interpolation filters to produce predictive blocks.

The inverse quantization unit 86 inverse quantizes, or de-quantizes, the quantized transform coefficients provided in the bitstream and decoded by the entropy decoding unit 80. The inverse quantization process may include use of a quantization parameter calculated by the encoding device 104 for each video block in the video slice to determine a degree of quantization and, likewise, a degree of inverse quantization that should be applied. The inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After the motion compensation unit 82 generates the predictive block for the current video block based on the motion vectors and other syntax elements, the decoding device 112 forms a decoded video block by summing the residual blocks from the inverse transform processing unit 88 with the corresponding predictive blocks generated by the motion compensation unit 82. The summer 90 represents the component or components that perform this summation operation. If desired, loop filters (either in the coding loop or after the coding loop) may also be used to smooth pixel transitions, or to otherwise improve the video quality. The filter unit 91 is intended to represent one or more loop filters such as a deblocking filter, an adaptive loop filter (ALF), and a sample adaptive offset (SAO) filter. Although the filter unit 91 is shown in FIG. 11 as being an in loop filter, in other configurations, the filter unit 91 may be implemented as a post loop filter. The decoded video blocks in a given picture are then stored in the picture memory 92, which stores reference pictures used for subsequent motion compensation. The picture memory 92 also stores decoded video for later presentation on a display device, such as the video destination device 122 shown in FIG. 1.

In this manner, the decoding device 112 of FIG. 11 represents an example of a video decoder configured to determine adaptive parameters, as described above. For instance, in some cases, the decoding device 112 may perform any of the techniques described herein, including the processes described above with respect to FIG. 9.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium that includes program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing 360-degree video data, comprising:
    obtaining a picture of the 360-degree video data, wherein the picture comprises samples projected from a three-dimensional format to a two-dimensional format;
    determining a weight value for at least one sample of the picture, wherein the weight value is determined based at least on a position of the at least one sample in the picture, the weight value being lower for pole areas of the picture in the two-dimensional format;
    determining a normalized weight based on the weight value multiplied by a height of the picture and divided by a sum of weights of the samples in the picture;
    determining at least one adaptive parameter for the at least one sample using the determined normalized weight value, the at least one adaptive parameter comprising one or more of an adaptive weighted distortion, an adaptive weighted quantization parameter (QP) value, or an adaptive weighted lambda value; and
    determining a cost associated with coding the at least one sample using one or more coding modes, wherein the cost is determined using the at least one adaptive parameter determined for the at least one sample, the at least one adaptive parameter causing fewer bits to be used when encoding one or more samples in the pole areas.

2. The method of claim 1, further comprising:
    determining a coding mode for encoding the at least one sample, the coding mode being determined based on the determined cost; and
    encoding the at least one sample using the determined coding mode.

3. The method of claim 1, wherein the at least one adaptive parameter comprises the adaptive weighted distortion, the adaptive weighted distortion comprising a distortion of the at least one sample multiplied by the determined normalized weight value.

4. The method of claim 3, wherein the distortion of the at least one sample comprises a difference between an original value of the at least one sample and a reconstructed value of the at least one sample.

5. The method of claim 1, wherein the at least one adaptive parameter comprises the adaptive weighted QP value, the adaptive weighted QP value comprising a QP value of the at least one sample modified by the determined normalized weight value.

6. The method of claim 1, wherein the at least one adaptive parameter comprises the adaptive weighted lambda value, the adaptive weighted lambda value comprising a lambda value of the at least one sample modified by the determined normalized weight value, wherein the lambda value of the at least one sample comprises a Lagrange constant representing a trade-off between distortion and a number of bits.

7. The method of claim 1, wherein the at least one adaptive parameter comprises the adaptive weighted distortion and the adaptive weighted QP value, the adaptive weighted distortion comprising a distortion of the at least one sample multiplied by the determined normalized weight value, and the adaptive weighted QP value comprising a QP value of the at least one sample modified by the determined normalized weight value.

8. The method of claim 1, wherein the at least one adaptive parameter comprises the adaptive weighted distortion and the adaptive weighted lambda value, the adaptive weighted distortion comprising a distortion of the at least one sample multiplied by the determined normalized weight value, and the adaptive weighted lambda value comprising a lambda value of the at least one sample modified by the determined normalized weight value.

9. The method of claim 1, wherein the at least one sample comprises a pixel, a block of pixels, or a row of blocks of pixels.

10. The method of claim 1, wherein the two-dimensional format comprises an equirectangular geometry.

11. The method of claim 1, wherein the cost comprises a rate-distortion optimization cost.

12. An apparatus for processing 360-degree video data, comprising:
    a memory configured to store the 360-degree video data; and
    a processor configured to:
        obtain a picture of the 360-degree video data, wherein the picture comprises samples projected from a three-dimensional format to a two-dimensional format;
        determine a weight value for at least one sample of the picture, wherein the weight value is determined based at least on a position of the at least one sample in the picture, the weight value being lower for pole areas of the picture in the two-dimensional format;
        determine a normalized weight value based on the weight value multiplied by a height of the picture and divided by a sum of weights of the samples in the picture;
        determine at least one adaptive parameter for the at least one sample using the determined normalized weight value, the at least one adaptive parameter comprising one or more of an adaptive weighted distortion, an adaptive weighted quantization parameter (QP) value, or an adaptive weighted lambda value; and
        determine a cost associated with coding the at least one sample using one or more coding modes, wherein the cost is determined using the at least one adaptive parameter determined for the at least one sample, the at least one adaptive parameter causing fewer bits to be used when encoding one or more samples in the pole areas.

13. The apparatus of claim 12, wherein the processor is further configured to:
    determine a coding mode for encoding the at least one sample, the coding mode being determined based on the determined cost; and
    encode the at least one sample using the determined coding mode.

14. The apparatus of claim 12, wherein the at least one adaptive parameter comprises the adaptive weighted distortion, the adaptive weighted distortion comprising a distortion of the at least one sample multiplied by the determined normalized weight value.

15. The apparatus of claim 14, wherein the distortion of the at least one sample comprises a difference between an original value of the at least one sample and a reconstructed value of the at least one sample.

16. The apparatus of claim 12, wherein the at least one adaptive parameter comprises the adaptive weighted QP value, the adaptive weighted QP value comprising a QP value of the at least one sample modified by the determined normalized weight value.

17. The apparatus of claim 12, wherein the at least one adaptive parameter comprises the adaptive weighted lambda value, the adaptive weighted lambda value comprising a lambda value of the at least one sample modified by the determined normalized weight value, wherein the lambda value of the at least one sample comprises a Lagrange constant representing a trade-off between distortion and a number of bits.

18. The apparatus of claim 12, wherein the at least one adaptive parameter comprises the adaptive weighted distortion and the adaptive weighted QP value, the adaptive weighted distortion comprising a distortion of the at least one sample multiplied by the determined normalized weight value, and the adaptive weighted QP value comprising a QP value of the at least one sample modified by the determined normalized weight value.

19. The apparatus of claim 12, wherein the at least one adaptive parameter comprises the adaptive weighted distortion and the adaptive weighted lambda value, the adaptive weighted distortion comprising a distortion of the at least one sample multiplied by the determined normalized weight value, and the adaptive weighted lambda value comprising a lambda value of the at least one sample modified by the determined normalized weight value.

20. The apparatus of claim 12, wherein the at least one sample comprises a pixel, a block of pixels, or a row of blocks of pixels.

21. The apparatus of claim 12, wherein the two-dimensional format comprises an equirectangular geometry.

22. The apparatus of claim 12, wherein the cost comprises a rate-distortion optimization cost.

23. The apparatus of claim 12, further comprising:
a camera for capturing 360-degree video.

24. The apparatus of claim 12, wherein the apparatus comprises a mobile device with a camera for capturing 360-degree video.

25. A non-transitory computer-readable medium having stored thereon instructions that, when executed by one or more processors, cause the one or more processors to:
obtain a picture of 360-degree video data, wherein the picture comprises samples projected from a three-dimensional format to a two-dimensional format;
determine a weight value for at least one sample of the picture, wherein the weight value is determined based at least on a position of the at least one sample in the picture, the weight value being lower for pole areas of the picture in the two-dimensional format;
determine a normalized weight value based the weight value multiplied by a height of the picture and divided by a sum of weights of the samples in the picture;
determine at least one adaptive parameter for the at least one sample using the determined normalized weight value, the at least one adaptive parameter comprising one or more of an adaptive weighted distortion, an adaptive weighted quantization parameter (QP) value, or an adaptive weighted lambda value; and
determine a cost associated with coding the at least one sample using one or more coding modes, wherein the cost is determined using the at least one adaptive parameter determined for the at least one sample, the at least one adaptive parameter causing fewer bits to be used when encoding one or more samples in the pole areas.

26. An apparatus for processing 360-degree video data, comprising:
means for obtaining a picture of the 360-degree video data, wherein the picture comprises samples projected from a three-dimensional format to a two-dimensional format;
means for determining a weight value for at least one sample of the picture, wherein the weight value is determined based at least on a position of the at least one sample in the picture, the weight value being lower for pole areas of the picture in the two-dimensional format;
means for determining a normalized weight value based on the weight value multiplied by a height of the picture and divided by a sum of weights of the samples in the picture;
means for determining at least one adaptive parameter for the at least one sample using the determined normalized weight value, the at least one adaptive parameter comprising one or more of an adaptive weighted distortion, an adaptive weighted quantization parameter (QP) value, or an adaptive weighted lambda value; and
means for determining a cost associated with coding the at least one sample using one or more coding modes, wherein the cost is determined using the at least one adaptive parameter determined for the at least one sample, the at least one adaptive parameter causing fewer bits to be used when encoding one or more samples in the pole areas.

* * * * *